United States Patent
Takeuchi et al.

(10) Patent No.: US 12,424,927 B2
(45) Date of Patent: Sep. 23, 2025

(54) POWER CONVERSION DEVICE WITH LOSS MINIMIZATION AND SYNCHRONIZED DETECTION AND SWITCHING FREQUENCY CHANGING

(71) Applicant: Mitsubishi Electric Corporation, Tokyo (JP)

(72) Inventors: Hayato Takeuchi, Tokyo (JP); Takato Toi, Tokyo (JP); Takaharu Ishibashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 203 days.

(21) Appl. No.: 18/248,797

(22) PCT Filed: Dec. 8, 2020

(86) PCT No.: PCT/JP2020/045601
§ 371 (c)(1),
(2) Date: Apr. 12, 2023

(87) PCT Pub. No.: WO2022/123646
PCT Pub. Date: Jun. 16, 2022

(65) Prior Publication Data
US 2023/0421051 A1    Dec. 28, 2023

(51) Int. Cl.
*H02M 1/14* (2006.01)
*H02M 3/158* (2006.01)

(52) U.S. Cl.
CPC .............. *H02M 1/14* (2013.01); *H02M 3/158* (2013.01)

(58) Field of Classification Search
CPC .......................................... H02M 3/155–1588
See application file for complete search history.

(56) References Cited

U.S. PATENT DOCUMENTS 7,145,317 B1 * 12/2006  Shah .................... H02M 3/156
                                                              323/288
7,812,576 B2 * 10/2010  Sutardja .............. H02M 1/4225
                                                              323/284
(Continued)

FOREIGN PATENT DOCUMENTS

JP    2011101554 A    5/2011
JP    2013126257 A    6/2013
(Continued)

OTHER PUBLICATIONS

International Search Report (PCT/ISA/210) with translation and Written Opinion (PCT/ISA/237) mailed on Mar. 2, 2021, by the Japan Patent Office as the International Searching Authority for International Application No. PCT/JP2020/045601. (9 pages).

*Primary Examiner* — Peter M Novak
(74) *Attorney, Agent, or Firm* — BUCHANAN, INGERSOLL & ROONEY PC

(57) ABSTRACT

An object is to obtain a power conversion device that can prevent ripple from increasing owing to change in switching frequency. A power conversion device includes: semiconductor switching elements connected between a DC voltage source and an output side, and connected in series to each other; a reactor; a control unit which controls a switching frequency of each semiconductor switching element; and a voltage detector, a voltage detector, and a current detector which respectively detect a voltage value of an input voltage, a voltage value of an output voltage, and a current value of an inductor current. Changing of the switching frequency and detection of the voltage value of the input voltage, the voltage value of the output voltage, and the current value of the inductor current are each performed at a timing that allows synchronization with a carrier.

20 Claims, 20 Drawing Sheets

(56) References Cited

U.S. PATENT DOCUMENTS

| | | | |
|---|---|---|---|
| 2006/0114702 A1* | 6/2006 | Yamada | ............. B60L 50/16 363/132 |
| 2018/0226913 A1 | 8/2018 | Hatakeyama et al. | |
| 2020/0274442 A1* | 8/2020 | Hanioka | ............. H02M 7/53873 |

FOREIGN PATENT DOCUMENTS

| | | |
|---|---|---|
| JP | 2017050977 A | 3/2017 |
| WO | 2017037941 A1 | 3/2017 |

* cited by examiner

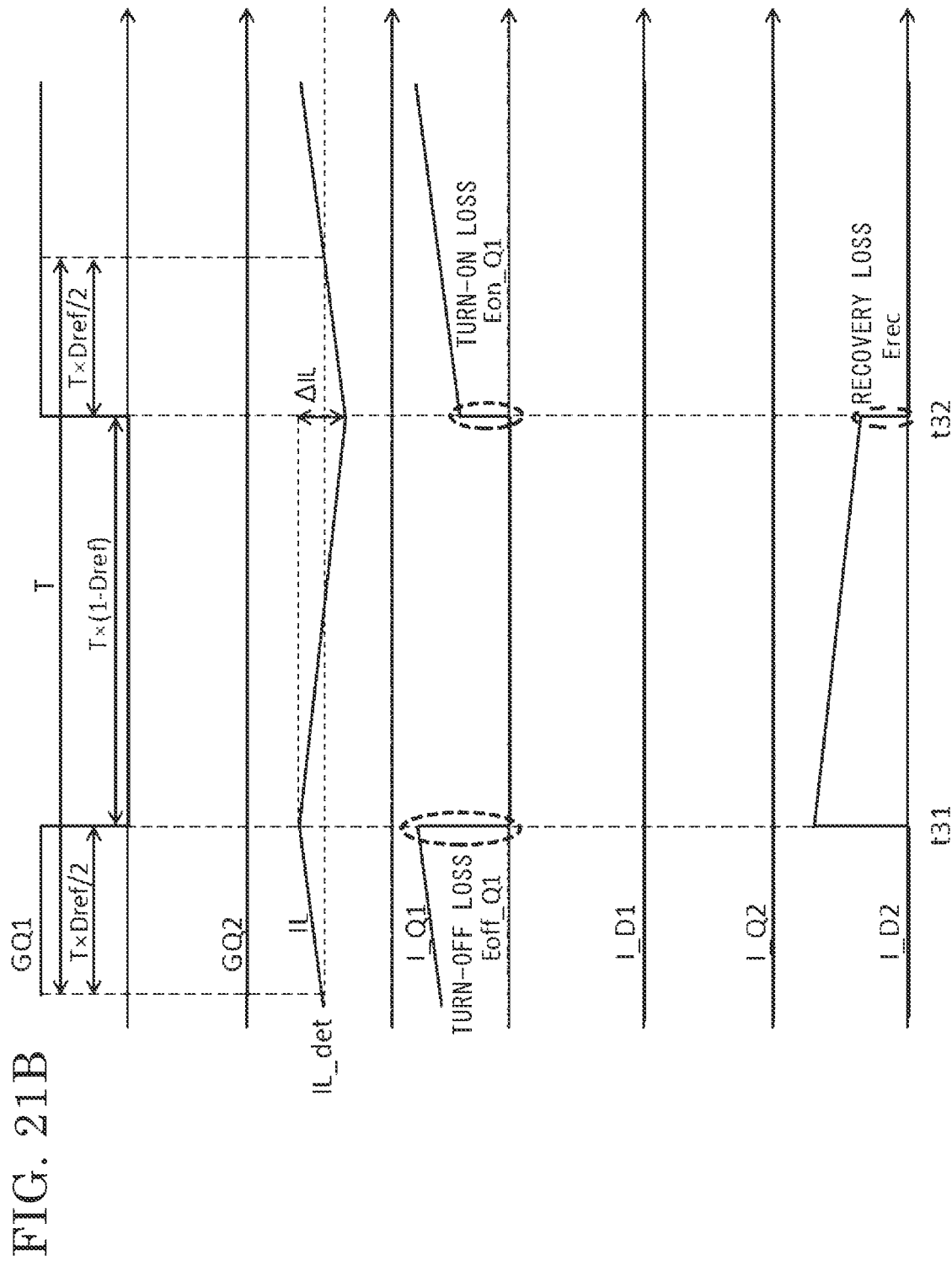

POWER CONVERSION DEVICE WITH LOSS MINIMIZATION AND SYNCHRONIZED DETECTION AND SWITCHING FREQUENCY CHANGING

TECHNICAL FIELD

The present disclosure relates to a power conversion device.

BACKGROUND ART

When power obtained through a photovoltaic power generation is connected to an AC grid by an inverter, a power conversion device including a chopper circuit for performing DC-DC conversion is used between the inverter and the photovoltaic device. Examples of a method for improving the efficiency of the chopper circuit include a method in which a switching frequency is controlled according to an operation state so that losses in the chopper circuit are decreased. Here, the losses in the chopper circuit include a loss in a reactor, a loss in a semiconductor switching element, and the like. Conventionally, there is a technology in which: a loss in a chopper circuit such as one described above is obtained as a function with respect to switching frequency; and a switching frequency at which the loss becomes minimum is selected (see, for example, Patent Document 1).

CITATION LIST

Patent Document

Patent Document 1: Japanese Laid-Open Patent Publication No. 2011-101554

SUMMARY OF THE INVENTION

Problems to be Solved by the Invention

However, in the case of using the technology described in Patent Document 1, ripple might increase in association with change in the switching frequency unless the timing of changing the switching frequency is appropriately set.

The present disclosure has been made to solve the above problem, and an object of the present disclosure is to obtain a power conversion device that can prevent ripple from increasing owing to change in switching frequency.

Solution to the Problems

A power conversion device according to the present disclosure is a power conversion device which converts an input voltage from a DC voltage source and outputs a resultant voltage as an output voltage. The power conversion device includes: a plurality of semiconductor switching elements connected between the DC voltage source and an output side, and connected in series to each other; an inductor connected between the DC voltage source and the output side; a control unit which controls a switching frequency of each of the plurality of semiconductor switching elements; and a detection unit which detects a voltage value of the input voltage, a voltage value of the output voltage, and a current value of an inductor current flowing through the inductor. The control unit includes: a voltage control unit which calculates an output voltage command value on the basis of the voltage value of the input voltage and the voltage value of the output voltage which have been obtained through the detection; a frequency control unit which calculates a frequency command value on the basis of the voltage value of the input voltage, the output voltage command value, and the switching frequency; and a carrier generation unit which generates a carrier on the basis of the frequency command value. Detection by the detection unit and changing of the switching frequency by the control unit are each performed at a timing that allows synchronization with the carrier.

Effect of the Invention

The power conversion device according to the present disclosure can prevent ripple from increasing owing to change in switching frequency.

BRIEF DESCRIPTION OF THE DRAWINGS

FIG. 21B shows a switching loss generation pattern in the power conversion device according to embodiment 6.

DESCRIPTION OF EMBODIMENTS

Embodiment 1

Figure 1:
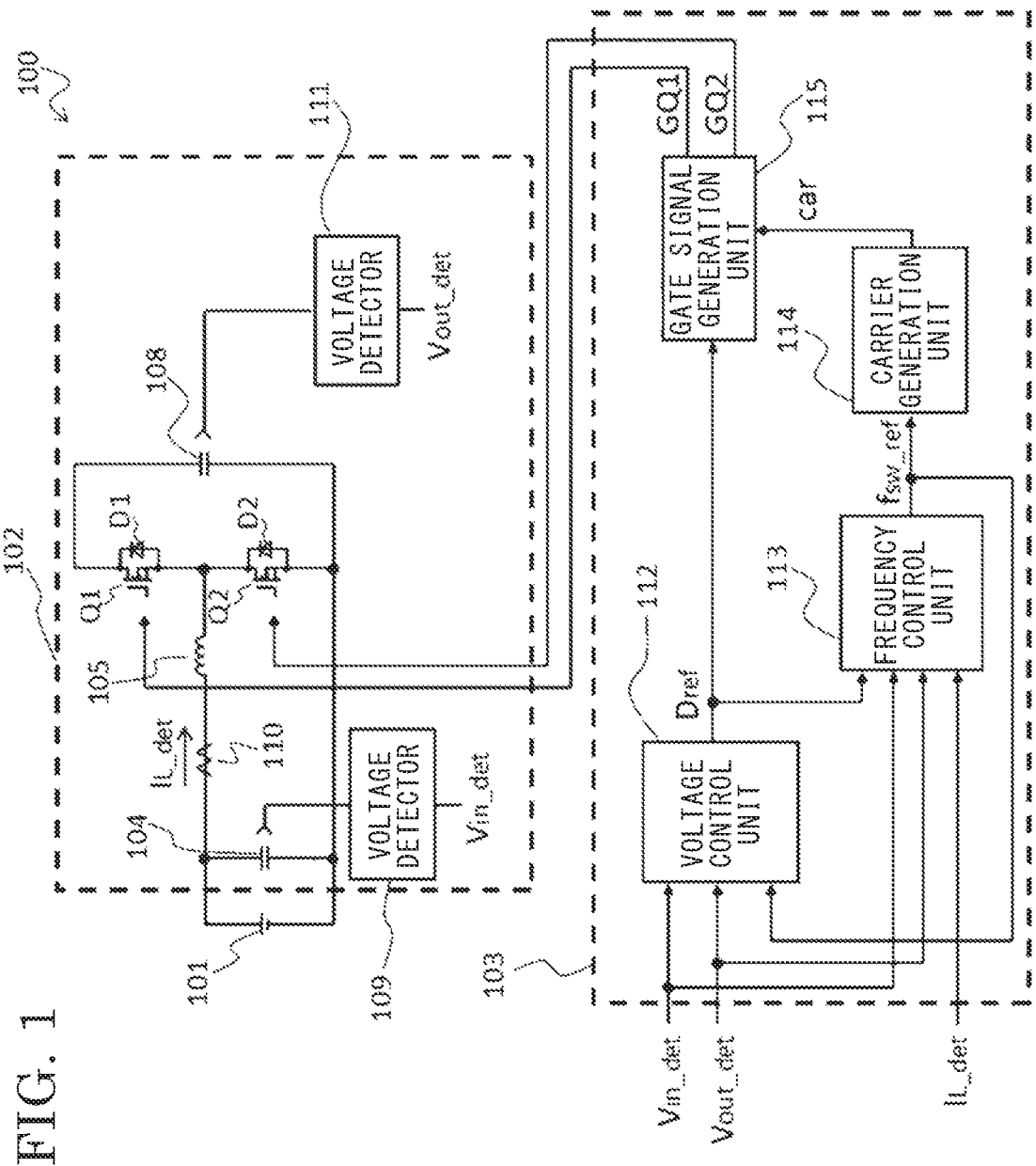
FIG. 1 is a schematic configuration diagram showing a power conversion device according to embodiment 1.

Embodiment 1 will be described with reference to FIG. 1 to FIG. 9 and FIG. 22. FIG. 1 is a schematic configuration diagram showing a power conversion device according to embodiment 1. A power conversion device 100 includes: a power conversion unit 102 which is connected to a DC voltage source 101 and converts an input voltage inputted from the DC voltage source 101 into an output voltage having a desired magnitude; and a control unit 103 which controls the power conversion unit 102.

The power conversion unit 102 has a boost chopper circuit including a semiconductor switching element Q1 and a semiconductor switching element Q2 which are connected in series to each other and which are each implemented by a metal oxide semiconductor field effect transistor (MOSFET). Specifically, a smoothing capacitor 104 is connected in parallel to the DC voltage source 101, and a connection point between a positive side of the DC voltage source 101 and a positive side of the smoothing capacitor 104 is connected via a reactor 105, i.e., an inductor, to a connection point between a source terminal of the semiconductor switching element Q1 and a drain terminal of the semiconductor switching element Q2. A drain terminal of the semiconductor switching element Q1 is connected to a positive side, of a smoothing capacitor 108, as an output side. A source terminal of the semiconductor switching element Q2 is connected to a negative side of the DC voltage source 101 and a negative side of the smoothing capacitor 108. In addition, a flyback diode D1 and a flyback diode D2 are respectively connected in antiparallel to the semiconductor switching element Q1 and the semiconductor switching element Q2.

A voltage across the smoothing capacitor 104 is detected as an input voltage by a voltage detector 109. The voltage detector 109 outputs the detected voltage value as an input voltage detection value Vin_det to the control unit 103. A voltage across the smoothing capacitor 108 is detected as an output voltage by a voltage detector 111. The voltage detector 111 outputs the detected voltage value as an output voltage detection value Vout_det to the control unit 103. A current detector 110 which detects inductor current is provided between the reactor 105 and the connection point between the positive side of the DC voltage source 101 and the positive side of the smoothing capacitor 104. The current detector 110 outputs the detected current value as an inductor current detection value IL_det to the control unit 103.

The control unit 103 includes: a voltage control unit 112 which receives the input voltage detection value Vin_det, the output voltage detection value Vout_det, the inductor current detection value IL_det, and a frequency command value fsw_ref (described later) and calculates a duty command value Dref, i.e., an output voltage command value, by using these values; a frequency control unit 113 which receives the input voltage detection value Vin_det, the output voltage detection value Vout_det, the inductor current detection value IL_det, and the duty command value Dref and calculates a frequency command value fsw_ref by using these values; a carrier generation unit 114 which receives the frequency command value fsw_ref and generates a carrier "car" by using the frequency command value fsw_ref; and a gate signal generation unit 115 which receives the duty command value Dref and the carrier "car" and generates a gate signal GQ1 and a gate signal GQ2 through PWM control by using the duty command value Dref and the carrier "car". The gate signal GQ1 and the gate signal GQ2 are gate signals for driving the semiconductor switching element Q1 and the semiconductor switching element Q2, respectively.

The voltage control unit 112 changes a control parameter according to the frequency command value fsw_ref. An example of the control parameter is an integral time Ti in proportional-integral control. The integral time Ti is determined according to the following expression (1).

[Mathematical 1]

$$T_i = \frac{1}{f_{sw\_ref}} \frac{1}{T_{io}} \quad (1)$$

In expression (1), Ti0 represents a design value of the integral time. By changing the integral time Ti according to the frequency command value fsw_ref as indicated by expression (1), calculation can be performed with the integral time being kept at the design value even when a switching frequency is changed.

Figure 2:
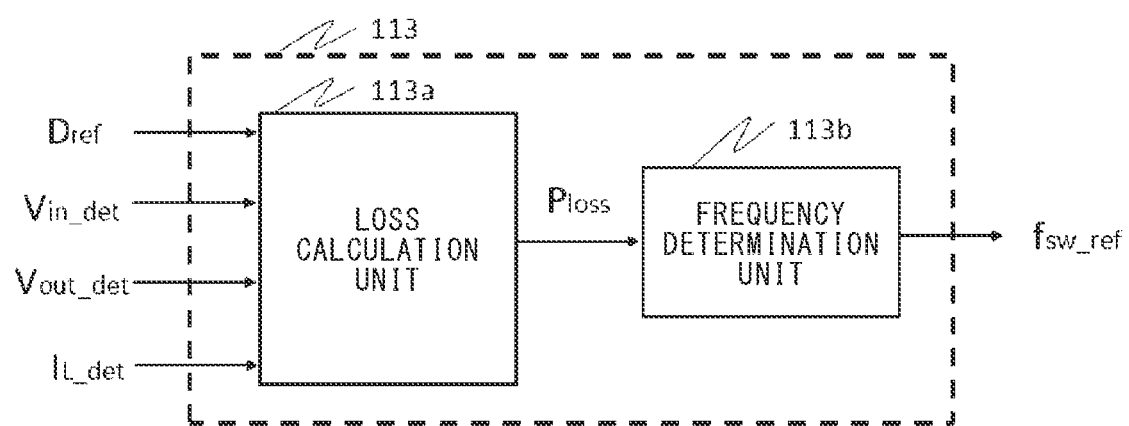
FIG. 2 is a block diagram showing a frequency control unit according to embodiment 1.

FIG. 2 is a block diagram showing the frequency control unit according to embodiment 1. The frequency control unit 113 includes: a loss calculation unit 113a which calculates a loss that occurs in the power conversion unit 102; and a frequency determination unit 113b which determines the frequency command value fsw_ref so as to optimize the loss. The loss calculation unit 113a receives the input voltage detection value Vin_det, the output voltage detection value Vout_det, the inductor current detection value IL_det, and the duty command value Dref and calculates a loss calculation value Ploss by using these values. The frequency determination unit 113b determines, by using a loss map having been preset from input/output voltages and inductor currents, the frequency command value fsw_ref so as to minimize the loss that occurs in the power conversion unit 102.

Figure 3:
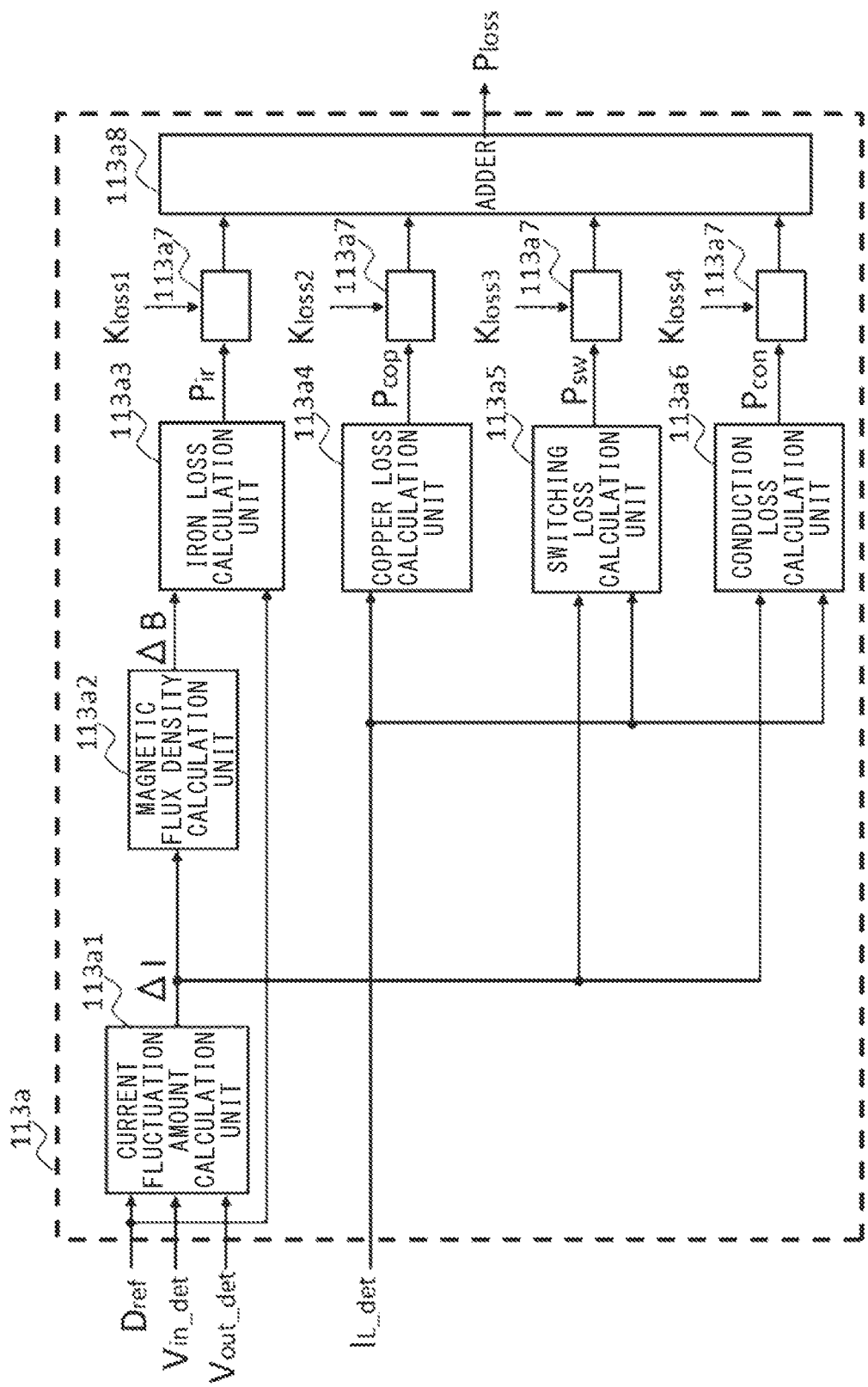
FIG. 3 is a block diagram showing a loss calculation unit according to embodiment 1.

FIG. 3 is a block diagram showing the loss calculation unit according to embodiment 1. The loss calculation unit 113a includes: a current fluctuation amount calculation unit 113a1 which receives the input voltage detection value Vin_det, the output voltage detection value Vout_det, and the duty command value Dref and calculates a current fluctuation amount ΔI by using these values; a magnetic flux density calculation unit 113a2 which calculates a magnetic flux density fluctuation amount ΔB by using the current fluctuation amount ΔI; an iron loss calculation unit 113a3 which calculates an iron loss Pir by using the magnetic flux density fluctuation amount ΔB and the duty command value Dref; a copper loss calculation unit 113a4 which calculates a copper loss Pcop by using the inductor current detection value IL_det; a switching loss calculation unit 113a5 which calculates a switching loss Psw by using the inductor current detection value IL_det and the current fluctuation amount ΔI; and a conduction loss calculation unit 113a6 which calculates a conduction loss Pcon by using the inductor current detection value IL_det and the current fluctuation amount ΔI. The loss calculation unit 113a further includes: four multipliers 113a7 which multiply the iron loss Pir, the copper loss Pcop, the switching loss Psw, and the conduction loss Pcon which have been calculated, by constants Kloss1, Kloss2, Kloss3, and Kloss4, respectively; and an adder 113a8 which calculates a loss calculation value Ploss by summing outputs from the respective multipliers 113a7.

The current fluctuation amount calculation unit 113a1 calculates the current fluctuation amount ΔI according to the following expression (2).

[Mathematical 2]

$$\Delta I = \frac{V_{in\_det}}{L} \frac{D_{ref}}{f_{sw}} \quad (2)$$

In expression (2), L represents the inductance of the reactor 105, and fsw represents a switching frequency of each of the semiconductor switching elements Q1, Q2.

The magnetic flux density calculation unit 113a2 calculates the magnetic flux density fluctuation amount ΔB according to the following expression (3).

[Mathematical 3]

$$\Delta B = \frac{L\Delta I}{NS} \quad (3)$$

In expression (3), N represents the number of turns of the reactor 105, and S represents the core cross-sectional area of the reactor 105.

The iron loss calculation unit 113a3 calculates the iron loss Pir according to an improved generalized Steinmetz equation (iGSE) indicated as the following expression (4).

[Mathematical 4]

$$Vol_{core} k_i^* f_{sw}^\alpha \Delta B^{\beta^*-\alpha} \left\{ \left|\frac{\Delta B}{D_{ref}}\right|^\alpha D_{ref} + \left|\frac{\Delta B}{1-D_{ref}}\right|^\alpha (1-D_{ref}) \right\} \quad (4)$$

In expression (4), VOlcore represents the core volume of the reactor 105, and α, β*, and k*i represent constants determined according to the magnetic flux density fluctuation amount ΔB, the DC-biased magnetization, and characteristics of a magnetic material of the reactor 105. For example, if a ferrite is used as the magnetic material, the value of α is 0 to 2, the value of β* is 0 to 4, and the value of k*i is 0 to 12.

The copper loss calculation unit 113a4 calculates the copper loss Pcop according to the following expression (5).

[Mathematical 5]

$$P_{cop} = R_w \left( I_{L\_det}^2 + \frac{\Delta I^2}{12} \right) \quad (5)$$

In expression (5), Rw represents the winding resistance of the reactor 105, and IL_det represents the inductor current detection value described above.

The switching loss calculation unit 113a5 calculates the switching loss Psw in each of the semiconductor switching elements Q1, Q2 according to the following expression (6).

[Mathematical 6]

$$P_{sw} = f_{sw}(E_{onQ1} + E_{offQ1} + E_{rec} + E_{onQ2} + E_{offQ2}) \quad (22)$$

In expression (6), Eon_Q1 and Eoff_Q1 respectively represent a turn-on loss and a turn-off loss in the semiconductor switching element Q1, and Eon_Q2 and Eoff_Q2 respectively represent a turn-on loss and a turn-off loss in the semiconductor switching element Q2. Erec represents a recovery loss in the flyback diodes D1, D2.

Eon_Q1 is a function of a drain current ID_on_Q1 and a drain-source voltage VDS_onQ1 obtained at the time of turning on the semiconductor switching element Q1. Thus, Eon_Q1 is obtained from a drain current and a drain-source voltage obtained at the time of Eon_Q1 calculation by using, for example, a data sheet indicating the relationship between: turn-on loss; and drain current and drain-source voltage. Eoff_Q1 is a function of a drain current ID_off_Q1 and a drain-source voltage VDS_off_Q1 obtained at the time of turning off the semiconductor switching element Q1. Thus, Eoff_Q1 is obtained from a drain current and a drain-source voltage at the time of Eoff_Q1 calculation by using, for example, a data sheet indicating the relationship between: turn-off loss; and drain current and drain-source voltage. As such data sheets, data sheets created in advance may be used. The same applies to Eon_Q2 and Eoff_Q2. Erec is a function of an anode current IA_rec and a cathode-anode voltage VKA_rec obtained at the time of recovery. Thus, Erec is obtained from an anode current and a cathode-anode voltage obtained at the time of Erec calculation by using, for example, a data sheet indicating the relationship between: recovery loss; and anode current and cathode-anode voltage.

A current and a voltage obtained at the time of occurrence of each loss will be described later.

The method for calculating each of Eon_Q1 and the like included in the switching loss Psw is not limited to the method in which the corresponding data sheet is used as described above, and an approximation expression based on the corresponding current and voltage described above may be used. As an example, Eon_Q1 is expressed in an approximate manner as a power series of ID, as in the following expression (7). In expression (7), ID represents a current value obtained at the timing of occurrence of the turn-on loss in the semiconductor switching element Q1, and is a value calculated according to the inductor current detection value IL_det. "an" (n is a positive integer) represents a coefficient obtained by creating an approximation expression on the basis of the data sheet.

[Mathematical 7]

$$E_{onQ1} = a_0 + a_1 I_D + a_2 I_D^2 + \ldots + a_n I_D^n \quad (7)$$

The same applies to the other losses included in expression (6). That is, Eoff_Q1, Eon_Q2, Eoff_Q2, and Erec can be obtained in an approximate manner as power series respectively based on: a current value obtained at the timing of occurrence of the turn-off loss in the semiconductor switching element Q1; a current value obtained at the timing of occurrence of the turn-on loss in the semiconductor switching element Q2; a current value obtained at the timing of occurrence of the turn-off loss in the semiconductor switching element Q2; and a current value obtained at the timing of occurrence of the recovery loss in the flyback diodes D1, D2.

The conduction loss calculation unit 113a6 calculates the conduction loss Pcon in each of the semiconductor switching elements Q1, Q2 according to the following expression (8).

[Mathematical 8]

$$P_{con} = (V_{on\_DS} + V_{on\_SD}) I_{L\_det} \quad (8)$$

In expression (8), Von_DS represents an ON voltage between the drain and the source of each of the semiconductor switching elements Q1, Q2, Von_SD represents an ON voltage between the source and the drain of each of the semiconductor switching elements Q1, Q2, and Von_DS and Von_SD are values dependent on drain current and source current, respectively.

The multipliers 113a7 multiply the iron loss Pir, the copper loss Pcop, the switching loss Psw, and the conduction loss Pcon which have been calculated as above, by the constants Kloss1, Kloss2, Kloss3, and Kloss4, respectively. Here, each of the constants Kloss1, Kloss2, Kloss3, and Kloss4 is 0 or 1. The adder 113a8 calculates the loss calculation value Ploss by summing the losses resulting from the multiplication by the respective constants Kloss1, Kloss2, Kloss3, and Kloss4.

Figure 22:
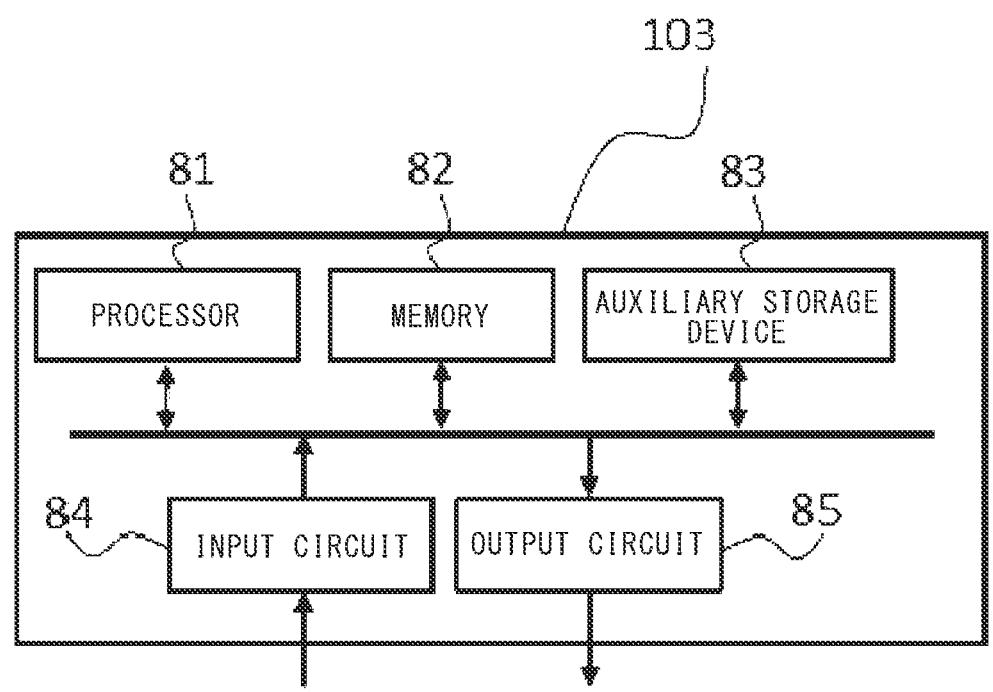
FIG. 22 shows an example of a hardware configuration in the control unit according to each embodiment.

Here, a hardware configuration for implementing each functional unit of the control unit 103 will be described. FIG. 22 shows an example of the hardware configuration in the control unit of the power conversion device according to each embodiment. The control unit 103 is mainly composed of: a processor 81; a memory 82 as a main storage device; and an auxiliary storage device 83. The processor 81 is implemented by, for example, a central processing unit (CPU), an application specific integrated circuit (ASIC), a digital signal processor (DSP), a field programmable gate array (FPGA), or the like. The memory 82 is implemented by a volatile storage device such as a random access memory, and the auxiliary storage device 83 is implemented by a nonvolatile storage device such as a flash memory, a hard disk, or the like. The auxiliary storage device 83 stores therein a predetermined program to be executed by the processor 81, and, as appropriate, the processor 81 reads and executes the program to perform various kinds of computation processes. At this time, the above predetermined program is temporarily saved from the auxiliary storage device 83 into the memory 82, and the processor 81 reads the program from the memory 82. As described above, each of computation processes by the respective functional units shown in FIG. 2 and FIG. 3 is realized through execution of the predetermined program by the processor 81. The result of the execution of the computation process by the processor 81 is temporarily stored in the memory 82 and is, according to the purpose of the executed computation process, stored in the auxiliary storage device 83.

The control unit 103 further includes: an input circuit 84 which receives, as inputs, the inductor current detection value IL_det, the input voltage detection value Vin_det, and the output voltage detection value Vout_det outputted from the power conversion unit 102; and an output circuit 85 which outputs the gate signals GQ1 and GQ2 to the power conversion unit 102.

Figure 4A:
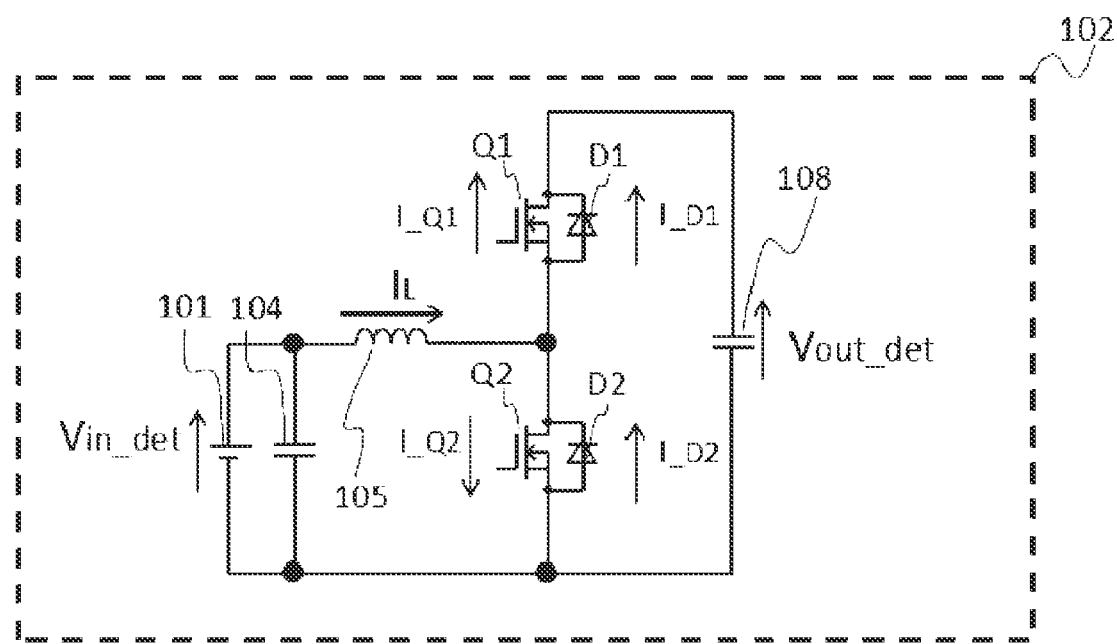
FIG. 4A is a circuit diagram of a boost chopper according to embodiment 1.
Figure 4B:
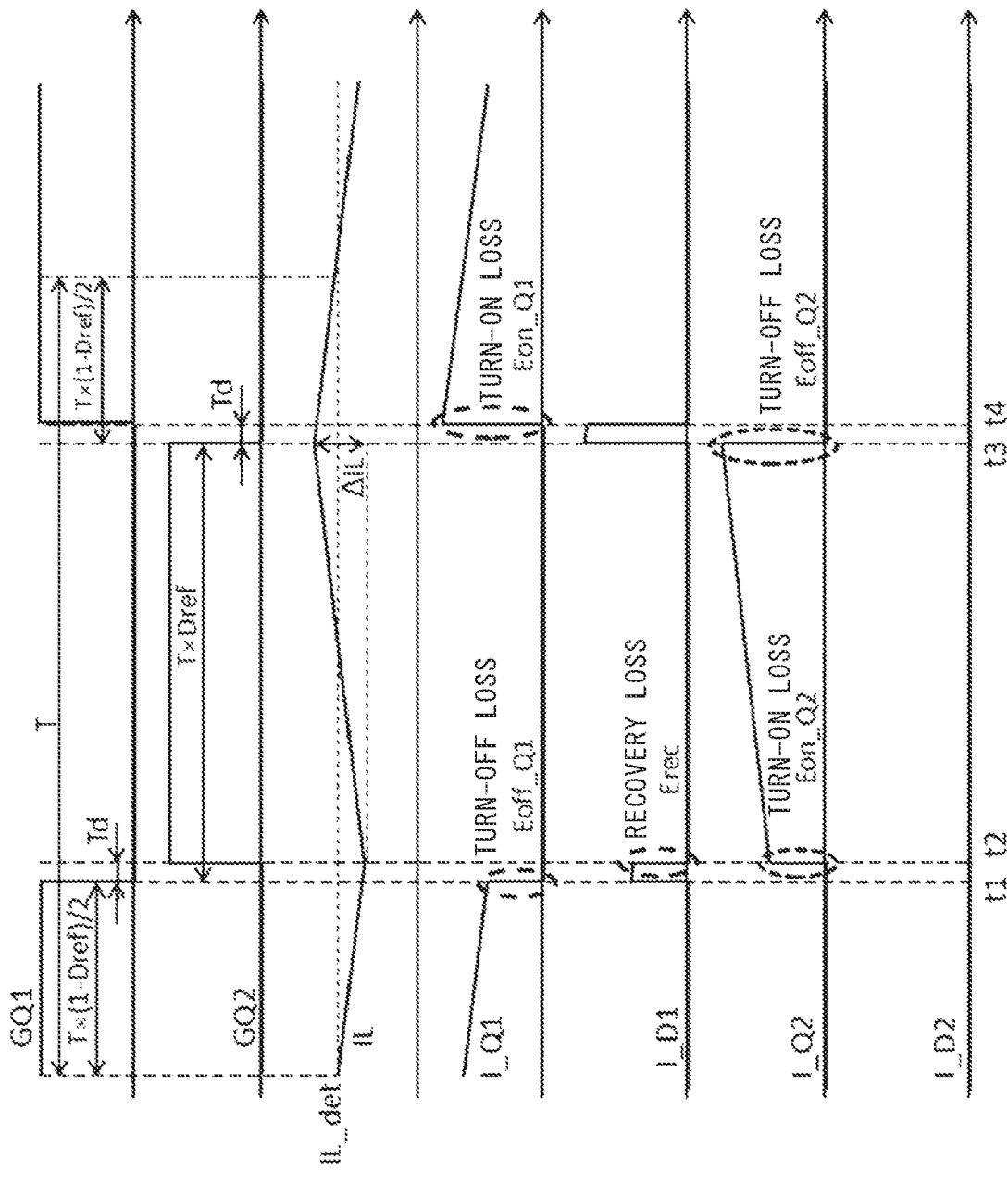
FIG. 4B shows a switching loss generation pattern in the power conversion device according to embodiment 1.

Next, a switching loss generation pattern will be described. FIG. 4A is a circuit diagram of the boost chopper according to embodiment 1, and FIG. 4B shows a switching loss generation pattern in the power conversion device according to embodiment 1. In FIG. 4A, I_Q1 represents a current flowing through the semiconductor switching element Q1, and I_Q2 represents a current flowing through the semiconductor switching element Q2. I_D1 represents a current flowing through the flyback diode D1, and I_D2 represents a current flowing through the flyback diode D2. In the following descriptions, an inductor current IL flowing through the reactor 105 constantly has a positive value. Positive directions of the respective currents and voltages are as shown in FIG. 4A.

In FIG. 4B, a state taken at the time of detecting the inductor current IL is defined as an initial state. In the initial state, the gate signal GQ1 is ON (the semiconductor switching element Q1 is ON), and the gate signal GQ2 is OFF (the semiconductor switching element Q2 is OFF). If a control cycle is defined as T, the gate signal GQ1 is caused to be OFF (the semiconductor switching element Q1 is turned off) at a time point t1 (=T×(1−Dref)/2) on the basis of the duty command value Dref. At a time point t2 (=t1+td), the gate signal GQ2 is caused to be ON (the semiconductor switching element Q2 is turned on). It is noted that td represents a dead time. At a time point t3 (=t1+T×Dref), the gate signal GQ2 is caused to be OFF (the semiconductor switching element Q2 is turned off). At a time point t4 (=t3+td), the gate signal GQ1 is caused to be ON again (the semiconductor switching element Q1 is turned on).

As shown in FIG. 4B, the turn-off loss (Eoff_Q1) in the semiconductor switching element Q1 occurs at the time point t1, and the turn-on loss (Eon_Q2) in the semiconductor switching element Q2 occurs at the time point t2. In addition, the turn-off loss (Eoff_Q2) in the semiconductor switching element Q2 occurs at the time point t3, and the turn-on loss (Eon_Q1) in the semiconductor switching element Q1 occurs at the time point t4. Further, the recovery loss (Erec) in the flyback diode D1 occurs at the time point t2 at which the semiconductor switching element Q2 is turned on. In addition, the inductor current IL is equal to the inductor current detection value IL_det in the initial state, but thereafter, fluctuates at the cycle T. The width of the fluctuation during vibration is defined as ΔIL.

Figure 5:
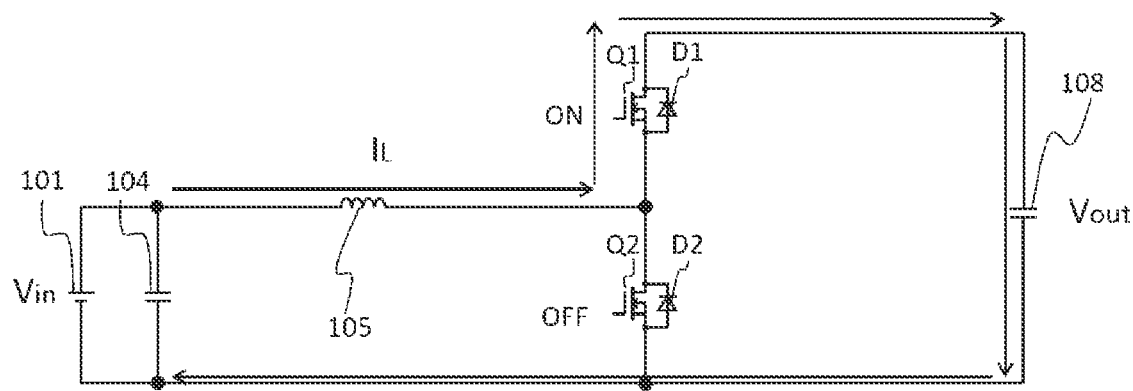
FIG. 5 shows a current path followed immediately before a semiconductor switching element Q1 is turned off, in the power conversion device according to embodiment 1.

FIG. 5 shows a current path followed immediately before the semiconductor switching element Q1 is turned off, in the power conversion device according to embodiment 1. In FIG. 5, Vin represents input voltage, and Vout represents output voltage. As shown in FIG. 5, the MOSFET implementing the semiconductor switching element Q1 is conducting current, and thus the current flowing through the boost chopper circuit is equal to the inductor current IL.

With reference to FIG. 4B and FIG. 5, in order to calculate the turn-off loss having occurred in the semiconductor switching element Q1 in the boost chopper, the following expression (9) and expression (10) are used to calculate a drain current ID_off_Q1 and a drain-source voltage VDS_off_Q1 obtained at the time of turning off the semiconductor switching element Q1.

[Mathematical 9]

$$I_{D\_off\_Q1} = I_{L\_det} - \frac{\Delta I}{2} \quad (9)$$

[Mathematical 10]

$$V_{DS\_off\_Q1} = V_{fwd\_D1} \quad (10)$$

In expression (10), Vfwd_D1 represents a forward voltage of the flyback diode D1 and has a value dependent on the current (I_D1) flowing through the flyback diode D1.

Figure 6:
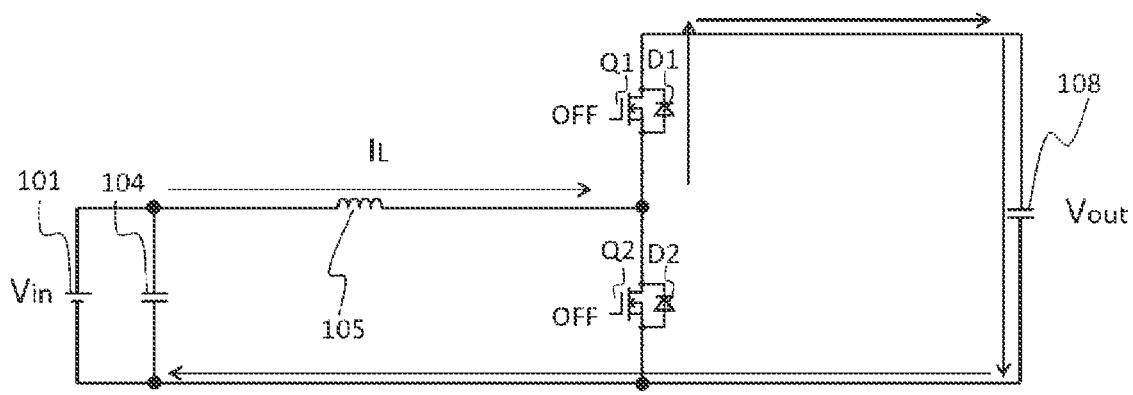
FIG. 6 shows a current path followed immediately before a semiconductor switching element Q2 is turned on, in the power conversion device according to embodiment 1.

FIG. 6 shows a current path followed immediately before the semiconductor switching element Q2 is turned on, in the power conversion device according to embodiment 1. FIG. 6 shows a current path followed during the dead time after the semiconductor switching element Q1 is turned off. However, since the dead time is considered to be sufficiently shorter than the control cycle, a change in current during the dead time is ignored. During the dead time after the semiconductor switching element Q1 is turned off, the current flowing through the flyback diode D1 is equal to the inductor current IL.

With reference to FIG. 4B and FIG. 6, in order to calculate the turn-on loss having occurred in the semiconductor switching element Q2 in the boost chopper, the following expression (11) and expression (12) are used to calculate a drain current ID_on_Q2 and a drain-source voltage VDS_on_Q2 obtained at the time of turning on the semiconductor switching element Q2.

[Mathematical 11]

$$I_{D\_on\_Q2} = I_{L\_det} - \frac{\Delta I}{2} \quad (11)$$

[Mathematical 12]

$$V_{DS\_on\_Q2} = V_{out\_det} \quad (12)$$

In addition, in order to calculate the recovery loss having occurred in the flyback diode D1, the following expression (13) and expression (14) are used to calculate an anode current IA_rec and a cathode-anode voltage VKA_rec obtained at the time of recovery of the flyback diode D1.

[Mathematical 13]

$$I_{A\_rec} = I_{L\_det} - \frac{\Delta I}{2} \quad (13)$$

[Mathematical 14]

$$V_{KA\_rec} = V_{out\_det} \quad (14)$$

Figure 7:
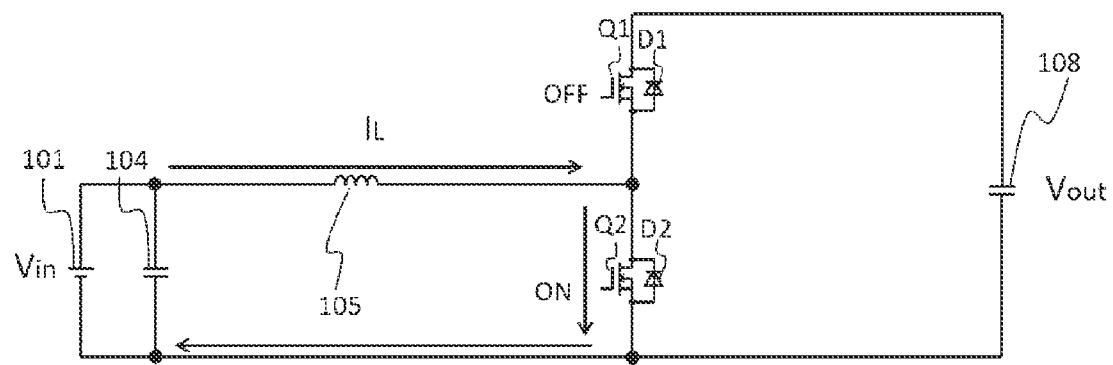
FIG. 7 shows a current path followed immediately before the semiconductor switching element Q2 is turned off, in the power conversion device according to embodiment 1.

FIG. 7 shows a current path followed immediately before the semiconductor switching element Q2 is turned off, in the power conversion device according to embodiment 1. As shown in FIG. 7, the MOSFET implementing the semiconductor switching element Q2 is conducting current, and thus the current flowing through the boost chopper circuit is equal to the inductor current IL.

With reference to FIG. 4B and FIG. 7, in order to calculate the turn-off loss having occurred in the semiconductor switching element Q2 in the boost chopper, the following expression (15) and expression (16) are used to calculate a drain current ID_off_Q2 and a drain-source voltage VDS_off_Q2 obtained at the time of turning off the semiconductor switching element Q2.

[Mathematical 15]

$$I_{D\_off\_Q2} = I_{L\_det} + \frac{\Delta I}{2} \quad (15)$$

[Mathematical 16]

$$V_{DS\_off\_Q2} = V_{out\_det} \quad (16)$$

Figure 8:
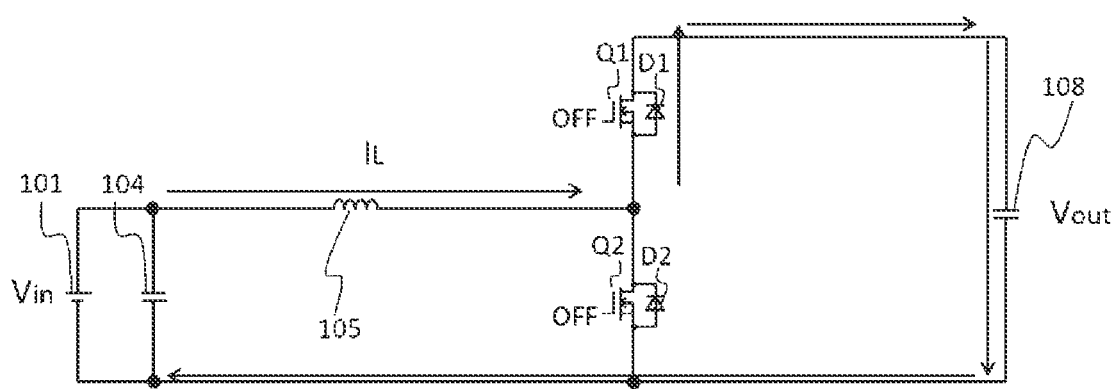
FIG. 8 shows a current path followed immediately before the semiconductor switching element Q1 is turned on, in the power conversion device according to embodiment 1.

FIG. 8 shows a current path followed immediately before the semiconductor switching element Q1 is turned on, in the power conversion device according to embodiment 1. FIG. 8 shows a current path followed during the dead time after the semiconductor switching element Q2 is turned off. During the dead time after the semiconductor switching element Q1 is turned off, the current flowing through the flyback diode D1 is equal to the inductor current IL. With reference to FIG. 4B and FIG. 8, in order to calculate the turn-on loss having occurred in the semiconductor switching element Q1 in the boost chopper, the following expression (17) and expression (18) are used to calculate a drain current ID_on_Q1 and a drain-source voltage VDS_on_Q1 obtained at the time of turning on the semiconductor switching element Q1.

[Mathematical 17]

$$I_{D\_on\_Q1} = I_{L\_det} + \frac{\Delta I}{2} \quad (17)$$

[Mathematical 18]

$$V_{DS\_on\_Q1} = V_{fwd\_D1} \quad (18)$$

Figure 9:
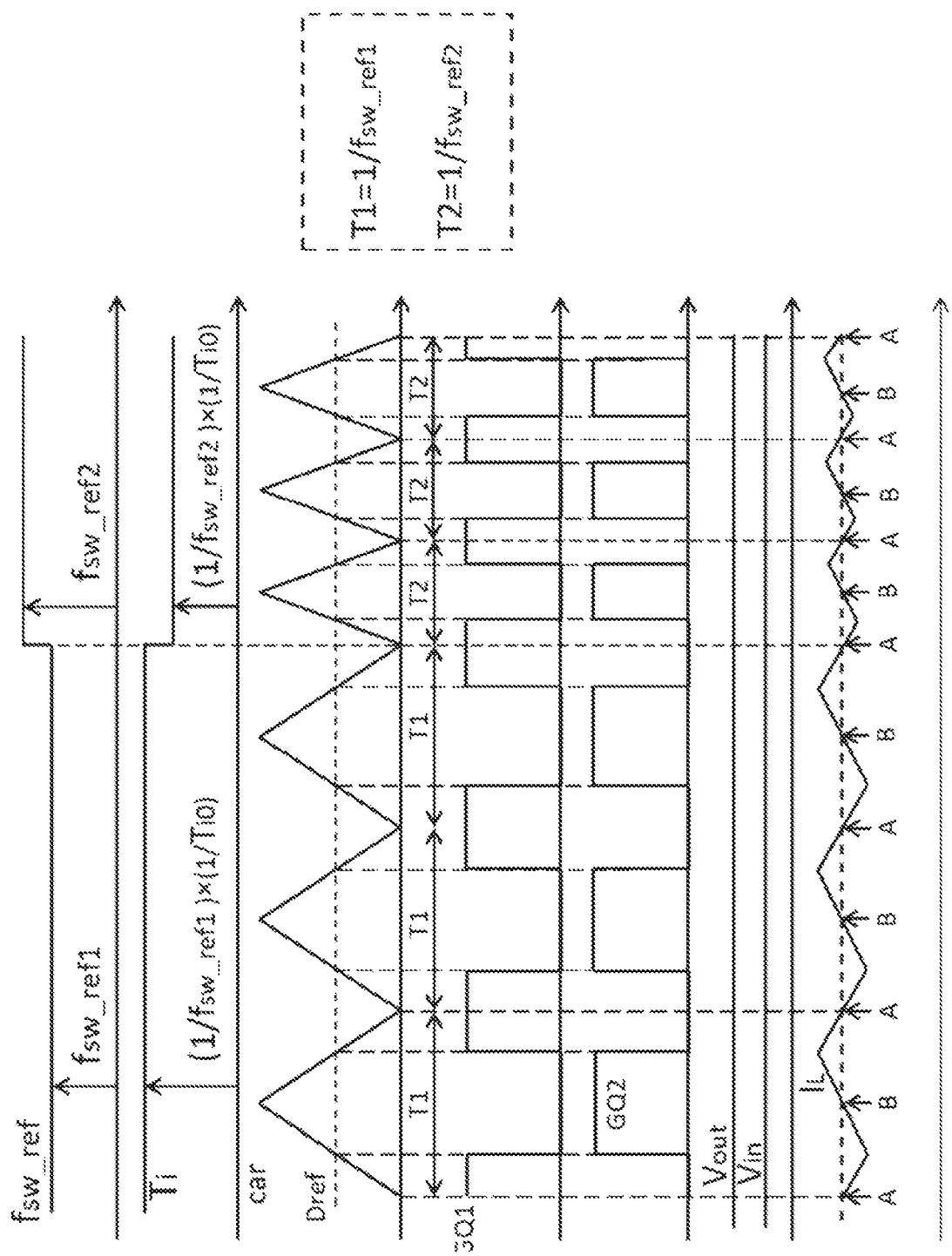
FIG. 9 shows a timing of updating a switching frequency in the power conversion device according to embodiment 1.

FIG. 9 shows a timing of updating the switching frequency in the power conversion device according to embodiment 1. In FIG. 9, changes in the frequency command value fsw_ref, the integral time Ti, the carrier "car", the gate signals GQ1 and GQ2, the output voltage Vout, the input voltage Vin, and the inductor current IL over time are shown. T1 and T2 represent switching cycles obtained when the frequency command value is fsw_ref1 and fsw_ref2, respectively. Each of "A"s shown in FIG. 9 represents a timing at which the phase of the carrier "car" in the form of a triangular wave becomes 0 degrees (the bottom of the carrier), and each of "B"s shown in FIG. 9 represents a timing at which the phase of the carrier "car" in the form of a triangular wave becomes 180 degrees (the top of the carrier).

In embodiment 1, the output voltage Vout, the input voltage Vin, and the inductor current IL are detected at the timing A. That is, the output voltage detection value Vout_det, the input voltage detection value Vin_det, and the inductor current detection value IL_det are acquired at this timing. As shown in FIG. 9, the inductor current IL fluctuates owing to influence of switching. However, since the inductor current IL is detected at the timing A at which the triangular wave carrier reaches the bottom thereof, influence of switching on the detection value can be decreased, and the average value of the inductor current IL can be detected. Alternatively, the output voltage Vout, the input voltage Vin, and the inductor current IL may be detected at the timing B at which the triangular wave carrier reaches the top thereof.

In this case as well, the average value of the inductor current IL can be detected in the same manner as in the case of the timing A.

In the case of changing the frequency command value fsw_ref from fsw_ref1 to fsw_ref2, the frequency command value fsw_ref and the integral time Ti are changed at the timing A at which the triangular wave carrier reaches the bottom thereof. This makes it possible to prevent ripple from increasing owing to change in the switching frequency. The same advantageous effect can be obtained if the frequency command value fsw_ref and the integral time Ti are changed at the timing B at which the triangular wave carrier reaches the top thereof.

Although a case where the carrier is a triangular wave carrier has been described in embodiment 1, a case where the carrier is a saw-tooth wave carrier is also conceivable. In the case where the carrier is a triangular wave carrier, detection of the input voltage and the like at the top or the bottom of the carrier makes it possible to decrease influence of ripple due to switching and detect the average value of the inductor current. Meanwhile, in the case where the carrier is a saw-tooth wave carrier, the timing of switching and each of the timings at which the carrier reaches the top and the bottom thereof coincide with each other. Thus, if the timing of detecting the input voltage and the like and the timing of changing the switching frequency are matched with the top or the bottom of the carrier, influence of ripple is inflicted. Considering this, detection of the input voltage and the like and changing of the switching frequency are performed in synchronization with the carrier while the timings of the detection and the changing are shifted from the timings at which the carrier reaches the top and the bottom thereof. Consequently, the same advantageous effect as that in the case of the above triangular wave carrier can be obtained.

Embodiment 1 makes it possible to prevent ripple from increasing owing to change in the switching frequency. More specifically, each of changing of the switching frequency and detection of the input voltage, the output voltage, and the inductor current performed in association with the changing of the switching frequency, is set to be performed at a timing that allows synchronization with the carrier. This makes it possible to decrease influence of switching on a detection value. In addition, changing of the switching frequency in a state where influence of switching on a detection value is decreased makes it possible to prevent ripple from increasing owing to change in the switching frequency.

Embodiment 2

Figure 10:
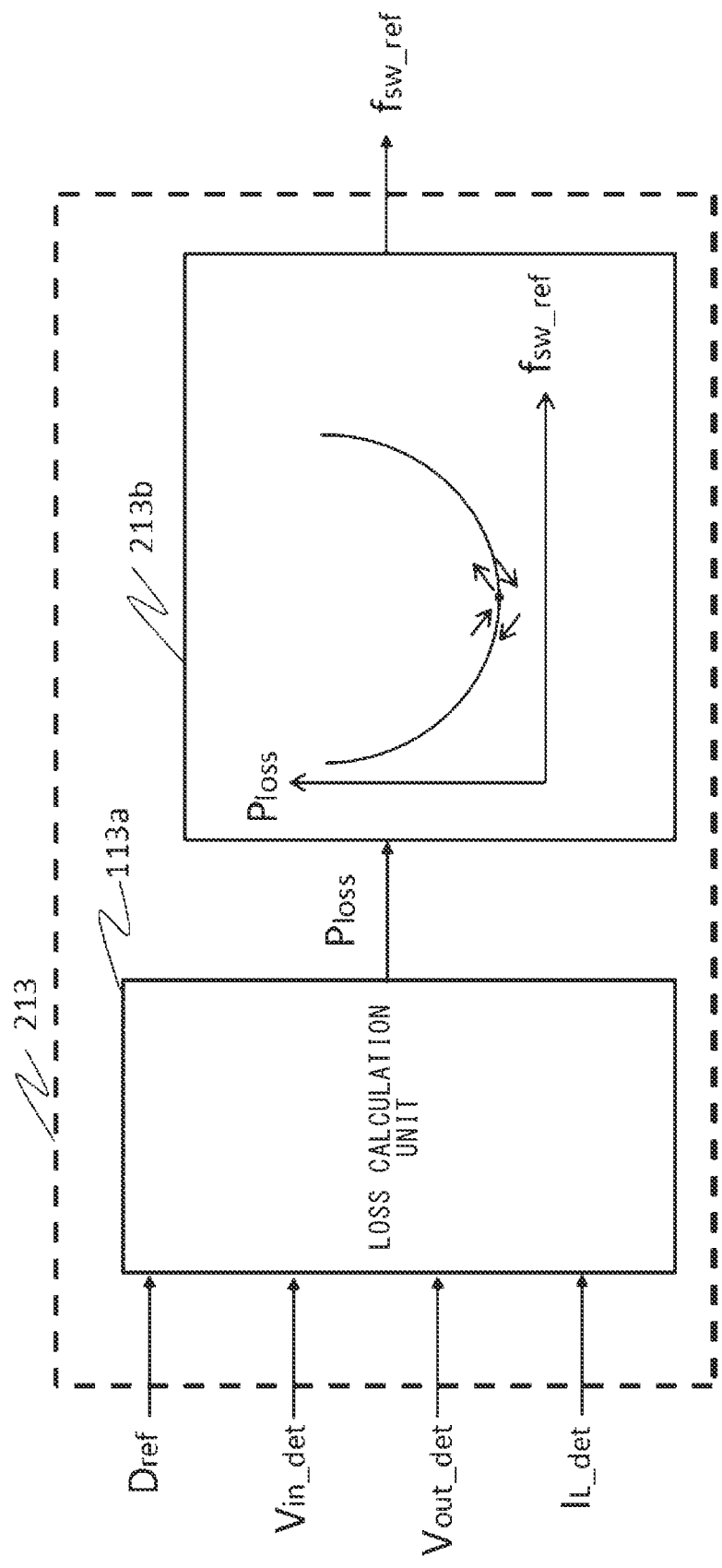
FIG. 10 shows a switching frequency control unit according to embodiment 2 and is a schematic diagram of frequency control in which hill climbing is employed.

Next, embodiment 2 will be described with reference to FIG. 10 to FIG. 12. In embodiment 1, a specific value of the frequency command value fsw_ref is determined by using the loss map. Meanwhile, in embodiment 2, the frequency command value fsw_ref is determined by employing hill climbing. FIG. 10 shows a frequency control unit according to embodiment 2 and is a schematic diagram of frequency control in which hill climbing is employed. A frequency control unit 213 includes the loss calculation unit 113a and a frequency determination unit 213b. The loss calculation unit 113a is the same as the loss calculation unit in embodiment 1. The frequency determination unit 213b determines the frequency command value fsw_ref so as to minimize the loss calculation value Ploss, by utilizing the fact that the loss calculation value Ploss is a function protruding downward with respect to switching frequency.

Figure 11:
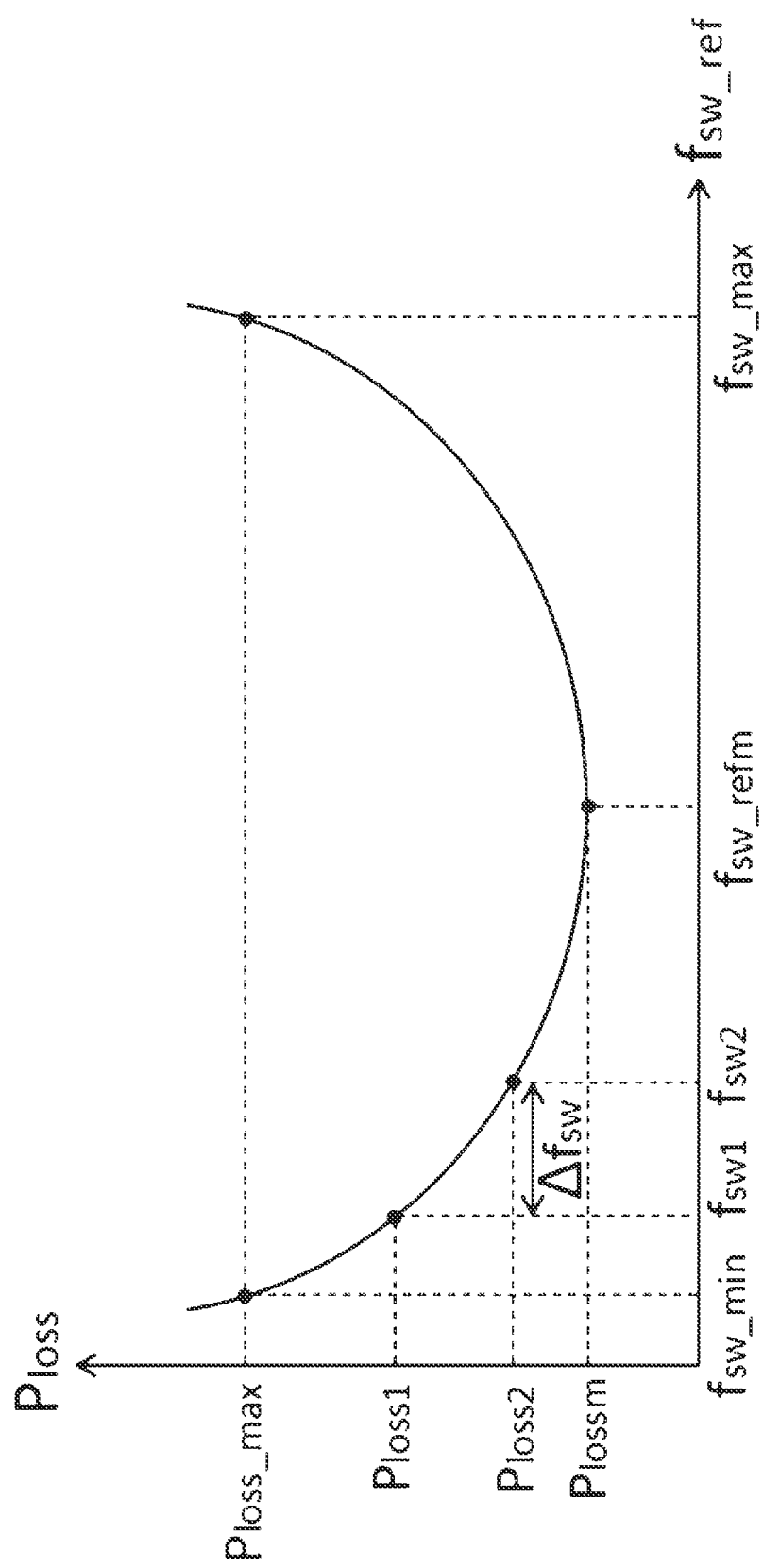
FIG. 11 is a diagram for explaining the frequency control in which hill climbing is employed.
Figure 12:
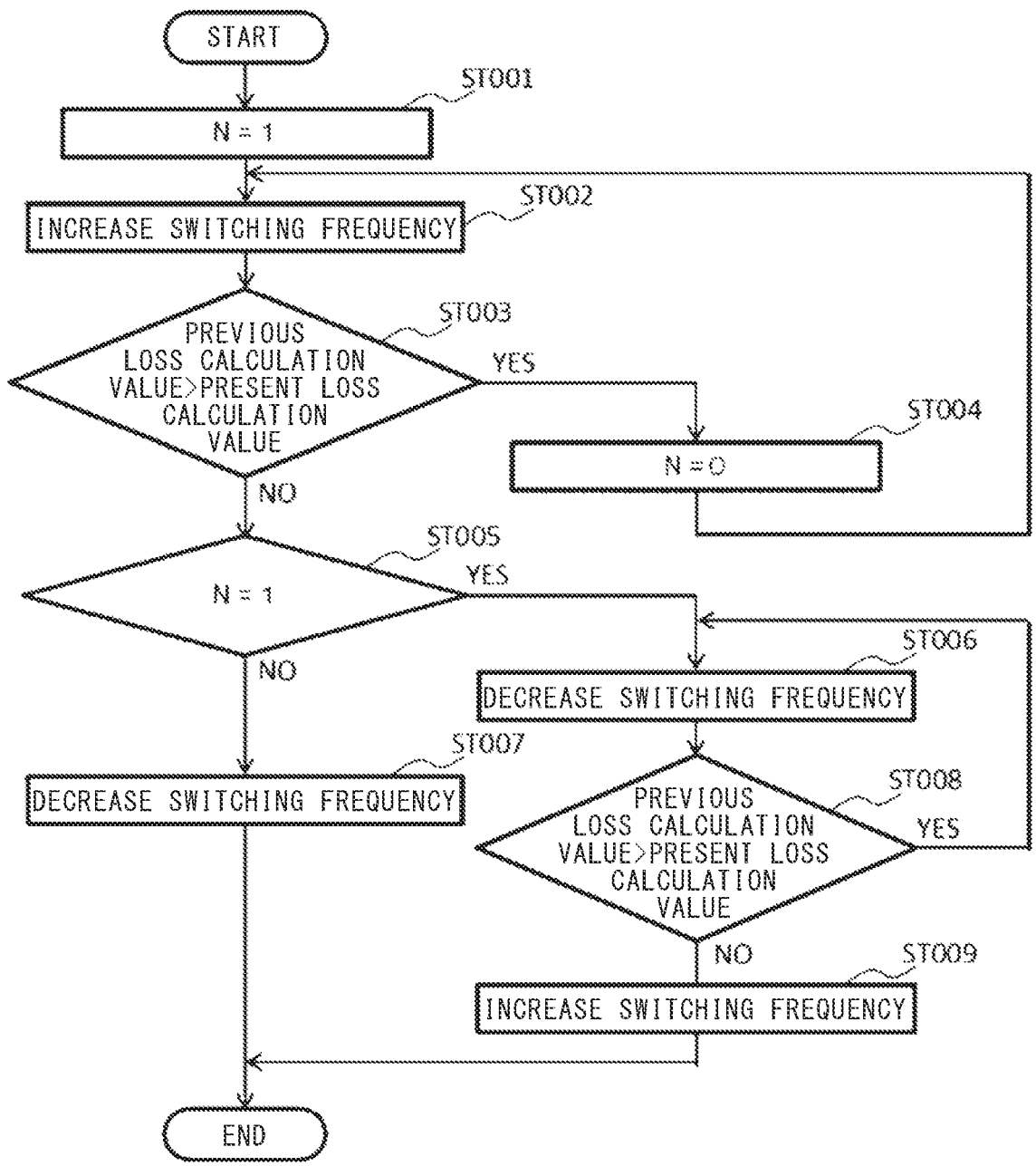
FIG. 12 is a flowchart showing operation of a frequency determination unit according to embodiment 2.

FIG. 11 is a diagram for explaining the frequency control in which hill climbing is employed, and shows an operation principle of the frequency determination unit 213b. In the case where the loss calculation value Ploss is in a relationship involving downward protrusion with respect to the switching frequency fsw, a frequency command value fsw_ref at which the loss calculation value Ploss becomes minimum can be searched for through hill climbing. The frequency determination unit 213b obtains a minimum-loss frequency fsw_refm at which the loss calculation value Ploss becomes minimum, in a situation in which a maximum value and a minimum value of the frequency command value fsw_ref are set to fsw_max and fsw_min on the basis of a maximum loss Ploss_max having been set in thermal design. As is known from expression (2) and expression (5), as the switching frequency fsw increases, the current fluctuation amount ΔI decreases and the copper loss Pcop also decreases. In addition, as the current fluctuation amount ΔI decreases, the conduction loss Pcon also decreases. Meanwhile, as is known from expression (6), as the switching frequency fsw increases, the switching loss Psw increases. The characteristic of the iron loss Pir with respect to the switching frequency fsw varies depending on the magnetic material, and in general, the iron loss Pir increases with respect to the switching frequency fsw if a ferrite core is used for an inductor (reactor) for the power conversion device.

In the case of obtaining the minimum-loss frequency fsw_refm through hill climbing, the loss calculation unit 113a first calculates a loss calculation value Ploss including at least one loss among the iron loss Pir, the copper loss Pcop, the switching loss Psw, and the conduction loss Pcon and inputs the loss calculation value Ploss to the frequency determination unit 213b. If operation is currently performed at a switching frequency fsw1 lower than the minimum-loss frequency fsw_refm, and the loss calculation value is Ploss1, the frequency determination unit 213b increases the switching frequency by Δfsw so that the switching frequency becomes fsw2. If a loss calculation value Ploss2 at which the switching frequency is fsw2 is smaller than the loss calculation value Ploss1 as shown in FIG. 11, the frequency determination unit 213b further increases the switching frequency by Δfsw. If a loss calculation value Ploss obtained after the increase in the switching frequency becomes larger than that obtained before the increase in the switching frequency, the frequency determination unit 213b determines that the switching frequency fsw has passed a value at which the loss becomes minimum. Accordingly, the frequency determination unit 213b decreases the switching frequency by Δfsw to return it to the previous value and determines that the value resulting from the returning is the minimum-loss frequency fsw_refm. The frequency determination unit 213b outputs the minimum-loss frequency fsw_refm as a frequency command value fsw_ref.

The operation of the frequency determination unit 213b will be described in detail with reference to the flowchart shown in FIG. 12. First, a variable N is set to a value of 1 (step ST001). The variable N is used to ascertain the relationship in magnitude between the switching frequency fsw and the minimum-loss frequency fsw_refm during searching for a loss minimization point through hill climbing. A loss calculation value Ploss obtained at the start of the searching is assumed to have already been calculated.

Next, the switching frequency fsw is increased by Δfsw (step ST002). A loss calculation value Ploss is calculated again by using the switching frequency fsw obtained after the increase. The previous (pre-switching-frequency-increase) loss calculation value Ploss and the present (post-switching-frequency-increase) loss calculation value Ploss are compared with each other (step ST003). If the previous loss calculation value Ploss is larger than the present loss calculation value Ploss, the process advances to step ST004. Meanwhile, if not (if the previous loss calculation value Ploss is equal to or smaller than the present loss calculation value Ploss), the process advances to step ST005.

If the previous loss calculation value Ploss is larger than the present loss calculation value Ploss in step ST003, the present value of the variable N is set to 0 (step ST004). In this case, the frequency determination unit 213b determines that the previous switching frequency fsw is lower than the minimum-loss frequency fsw_refm, and the process returns to step ST002. Consequently, if the situation in which "the previous loss calculation value Ploss is larger than the present loss calculation value Ploss" continues, the switching frequency fsw continues to be increased.

If the previous loss calculation value Ploss is equal to or smaller than the present loss calculation value Ploss in step ST003, whether the value of the variable N is 0 or 1 is determined (step ST005). If the value of the variable N is 1, the process advances to step ST006. If the value of the variable N is not 1 (is 0), the process advances to step ST007. If the variable N is 0, the frequency determination unit 213b determines that, as a result of the increase in the switching frequency, the switching frequency fsw has passed the value at which the loss becomes minimum, and decreases the switching frequency fsw by Δfsw (step ST007). The frequency determination unit 213b determines that the switching frequency fsw obtained after the decrease is the minimum-loss frequency fsw_refm, and ends the searching for the minimum-loss frequency fsw_refm.

If the value of the variable N is 1 in step ST005, the switching frequency fsw is decreased by Δfsw (step ST006).

After step ST006, a loss calculation value Ploss is calculated again by using the switching frequency fsw obtained after the decrease, and the previous (pre-switching-frequency-decrease) loss calculation value Ploss and the present (post-switching-frequency-decrease) loss calculation value Ploss are compared with each other (step ST008). If the previous loss calculation value Ploss is larger than the present loss calculation value Ploss, the frequency determination unit 213b determines that the previous switching frequency fsw is higher than the minimum-loss frequency fsw_refm, and the process returns to step ST006. Consequently, if the situation in which "the previous loss calculation value Ploss is larger than the present loss calculation value Ploss" continues, the switching frequency fsw continues to be decreased.

If the previous loss calculation value Ploss is equal to or smaller than the present loss calculation value Ploss, the process advances to step ST009. In this case, the frequency determination unit 213b determines that, as a result of the decrease in the switching frequency, the switching frequency fsw has passed the value at which the loss becomes minimum, and increases the switching frequency fsw by Δfsw (step ST009). The frequency determination unit 213b determines that the switching frequency fsw obtained after the increase is the minimum-loss frequency fsw_refm, and ends the searching for the minimum-loss frequency fsw_refm.

In embodiment 2, the same result as that in embodiment 1 can be obtained. In addition, the switching frequency command value at which the loss becomes minimum is determined through hill climbing, and thus, without presetting any loss map, the power converter can be operated with the switching frequency at which the loss becomes minimum.

Embodiment 3

Figure 13:
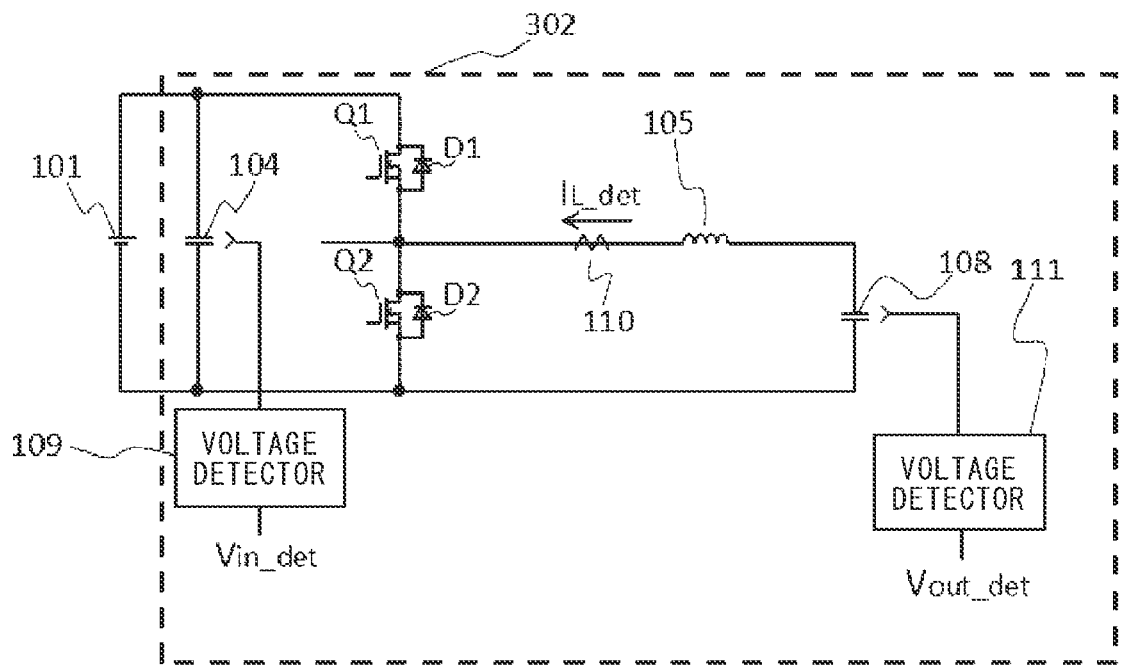
FIG. 13 is a circuit diagram of a power conversion device according to embodiment 3 and is a circuit diagram in a case where a power conversion unit is a buck chopper.

Next, embodiment 3 will be described with reference to FIG. 13. In embodiment 1 and embodiment 2, cases where the power conversion device is a boost chopper have been described. Meanwhile, in embodiment 3, a case where the power conversion device is a buck chopper will be described. FIG. 13 is a circuit diagram of a power conversion device according to embodiment 3 and is a circuit diagram in a case where the power conversion device is a buck chopper. In FIG. 13, the control unit is not shown. A power conversion unit 302 is connected to the DC voltage source 101 and driven by the control unit 103 (not shown).

The power conversion unit 302 has a buck chopper circuit including the semiconductor switching element Q1 and the semiconductor switching element Q2 which are connected in series to each other and which are each implemented by a MOSFET. Specifically, the smoothing capacitor 104 is connected in parallel to the DC voltage source 101, and the connection point between the positive side of the DC voltage source 101 and the positive side of the smoothing capacitor 104 is connected to the drain terminal of the semiconductor switching element Q1. The connection point between the source terminal of the semiconductor switching element Q1 and the drain terminal of the semiconductor switching element Q2 is connected via the reactor 105 to the positive side, of the smoothing capacitor 108, as the output side. The source terminal of the semiconductor switching element Q2 is connected to the negative side of the DC voltage source 101 and the negative side of the smoothing capacitor 108. The current detector 110 which detects inductor current is provided between the reactor 105 and the connection point between the source terminal of the semiconductor switching element Q1 and the drain terminal of the semiconductor switching element Q2. In addition, the flyback diode D1 and the flyback diode D2 are respectively connected in antiparallel to the semiconductor switching element Q1 and the semiconductor switching element Q2. The other components are the same as those in embodiment 1. In addition, basic operations of the buck chopper are the same as those of the boost chopper, the choppers being different only in that the input-output relationship in the buck chopper is opposite to that in the boost chopper. Thus, descriptions of the basic operations will be omitted.

As described above, the basic operations in embodiment 3 are also the same as those in embodiment 1. Thus, the same advantageous effect as that in embodiment 1 can be obtained in embodiment 3 as well by performing detection of the input voltage, the output voltage, and the inductor current and changing of the frequency command value in synchronization with the carrier in the same manner as in embodiment 1.

Embodiment 4

Figure 14:
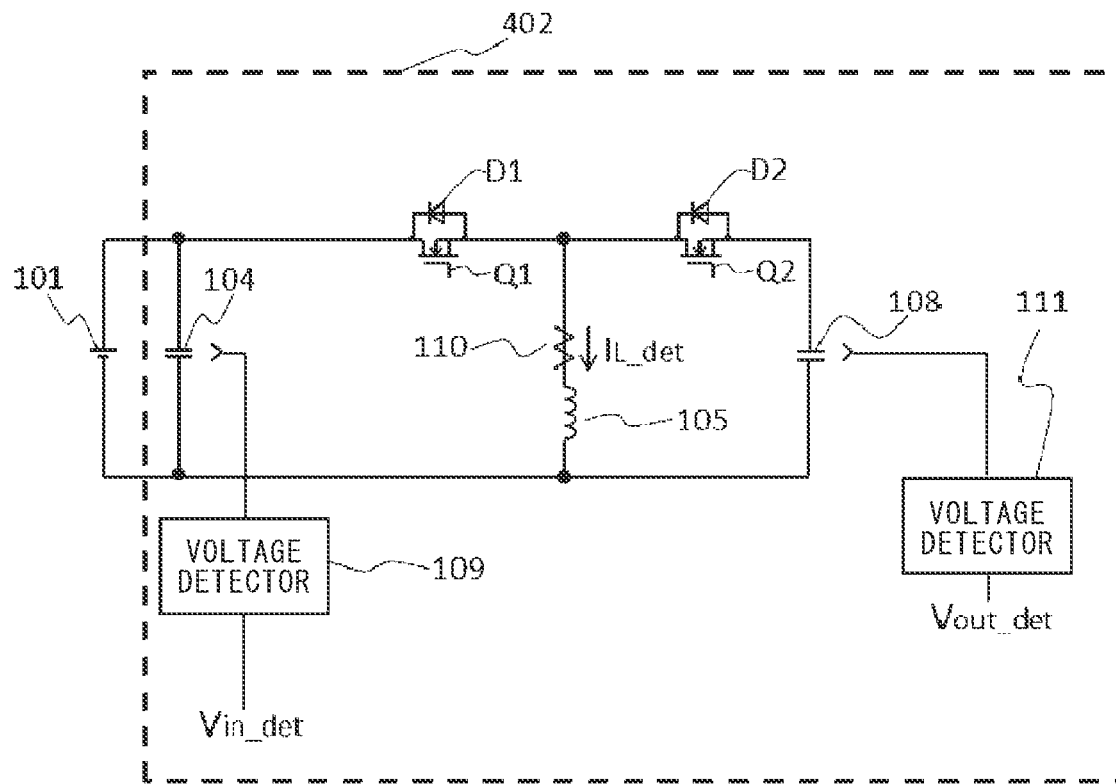
FIG. 14 is a circuit diagram of a power conversion device according to embodiment 4 and is a circuit diagram in a case where the power conversion unit is a buck-boost chopper.

Next, embodiment 4 will be described with reference to FIG. 14 to FIG. 19. In embodiment 4, a case where the power conversion device is a buck-boost chopper will be described. FIG. 14 is a circuit diagram of a power conversion device according to embodiment 4 and is a circuit diagram in a case where the power conversion device is a buck-boost chopper. In FIG. 14, the control unit is not shown. A power conversion unit 402 is connected to the DC voltage source 101 and driven by the control unit 103 (not shown).

The power conversion unit 402 has a buck-boost chopper circuit including the semiconductor switching element Q1 and the semiconductor switching element Q2 which are connected in series to each other and which are each implemented by a MOSFET. Specifically, the smoothing capacitor 104 and the reactor 105 are connected in parallel to the DC voltage source 101, and the connection point between the positive side of the DC voltage source 101 and the positive side of the smoothing capacitor 104 is connected to the drain terminal of the semiconductor switching element Q1. The connection point between the source terminal of the semiconductor switching element Q1 and the drain terminal of the semiconductor switching element Q2 is connected to one end of the reactor 105. The other end of the reactor 105 is connected to the negative side, of the smoothing capacitor 108, as the output side. The source terminal of the semiconductor switching element Q2 is connected to the positive side of the smoothing capacitor 108. The current detector 110 which detects inductor current is provided between the reactor 105 and the connection point between the source terminal of the semiconductor switching element Q1 and the drain terminal of the semiconductor switching element Q2. In addition, the flyback diode D1 and the flyback diode D2 are respectively connected in antiparallel to the semiconductor switching element Q1 and the semiconductor switching element Q2. The other components are the same as those in embodiment 1. Basic operations in the buck-boost chopper are also the same as those in the boost chopper and the buck chopper. However, a voltage value and a current value at the time of calculating a switching loss are different, and thus will be described below.

Figure 15A:
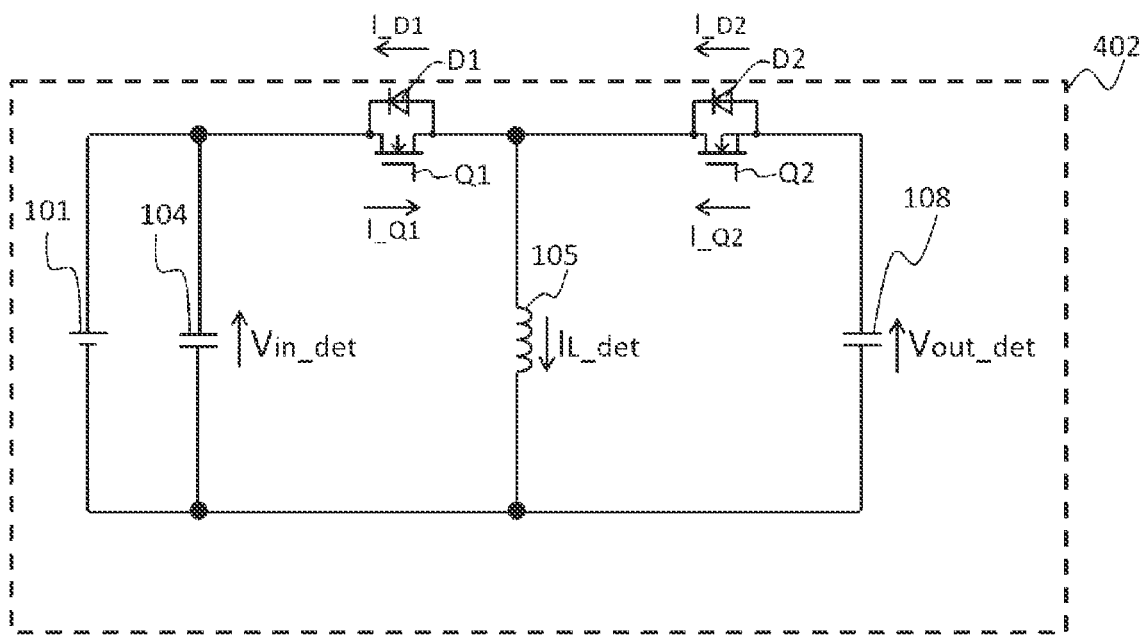
FIG. 15A is a circuit diagram of the buck-boost chopper according to embodiment 4.
Figure 15B:
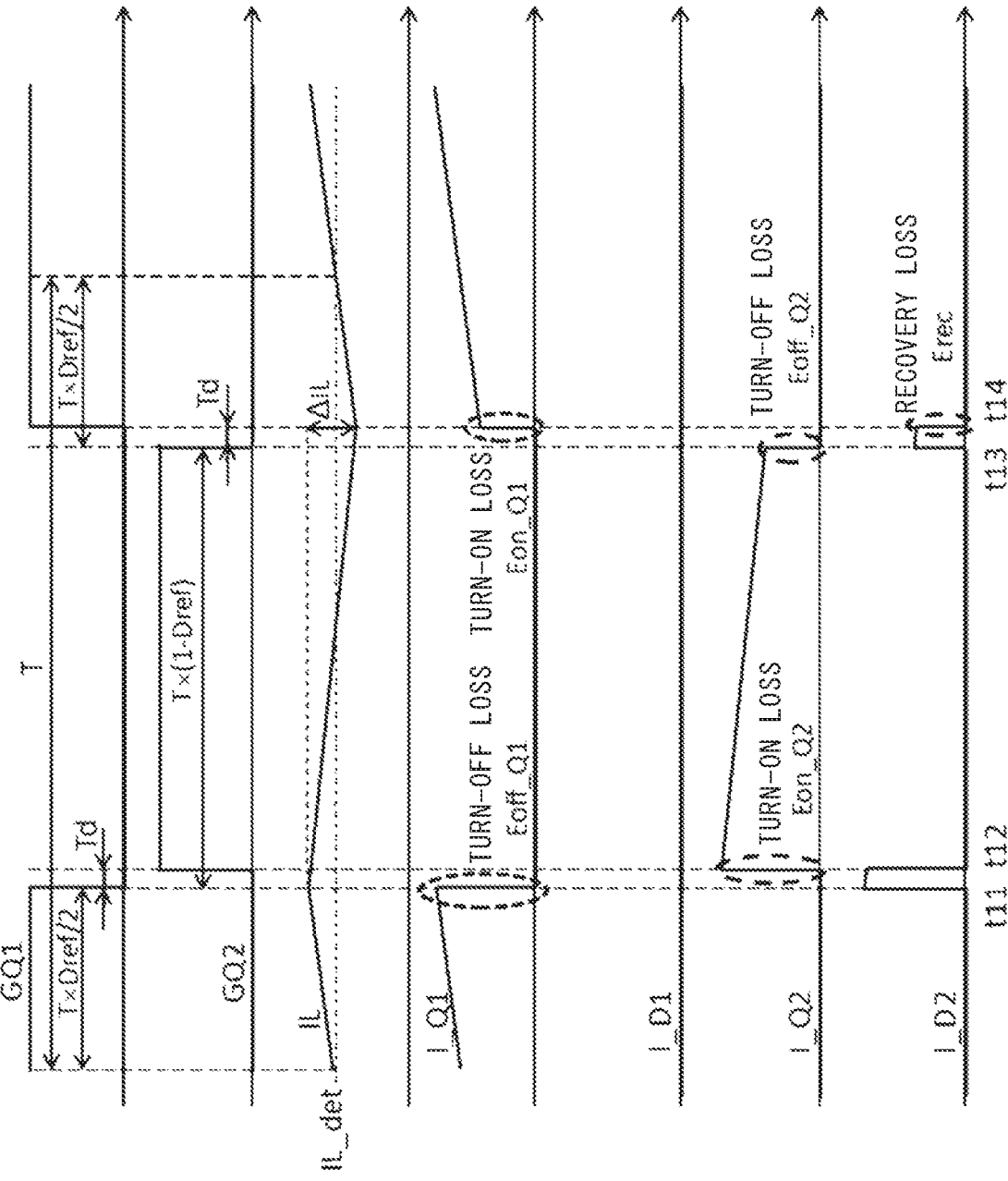
FIG. 15B shows a switching loss generation pattern in the power conversion device according to embodiment 4.

FIG. 15A is a circuit diagram of the buck-boost chopper according to embodiment 4, and FIG. 15B shows a switching loss generation pattern in the power conversion device according to embodiment 4. In FIG. 15A, I_Q1 represents a current flowing through the semiconductor switching element Q1, and I_Q2 represents a current flowing through the semiconductor switching element Q2. I_D1 represents a current flowing through the flyback diode D1, and I_D2 represents a current flowing through the flyback diode D2. In the following descriptions, an inductor current IL flowing through the reactor 105 constantly has a positive value. Positive directions of the respective currents and voltages are as shown in FIG. 15A.

In FIG. 15B, a state taken at the time of detecting the inductor current IL is defined as an initial state. In the initial state, the gate signal GQ1 is ON (the semiconductor switching element Q1 is ON), and the gate signal GQ2 is OFF (the semiconductor switching element Q2 is OFF). If a control cycle is defined as T, the gate signal GQ1 is caused to be OFF (the semiconductor switching element Q1 is turned off) at a time point t11 (=T×Dref/2) on the basis of the duty command value Dref. At a time point t12 (=t11+td), the gate signal GQ2 is caused to be ON (the semiconductor switching element Q2 is turned on). It is noted that td represents a dead time. At a time point t13 (=t11+T×(1−Dref)), the gate signal GQ2 is caused to be OFF (the semiconductor switching element Q2 is turned off). At a time point t14 (=t13+td), the gate signal GQ1 is caused to be ON again (the semiconductor switching element Q1 is turned on).

As shown in FIG. 15B, the turn-off loss (Eoff_Q1) in the semiconductor switching element Q1 occurs at the time point t11, and the turn-on loss (Eon_Q2) in the semiconductor switching element Q2 occurs at the time point t12. In addition, the turn-off loss (Eoff_Q2) in the semiconductor switching element Q2 occurs at the time point t13, and the turn-on loss (Eon_Q1) in the semiconductor switching element Q1 occurs at the time point t14. Further, the recovery loss (Erec) in the flyback diode D2 occurs at the time point t14 at which the semiconductor switching element Q1 is turned on. The inductor current IL is equal to the inductor current detection value IL_det in the initial state, but thereafter, fluctuates at the cycle T. The width of the fluctuation during vibration is defined as ΔIL.

Figure 16:
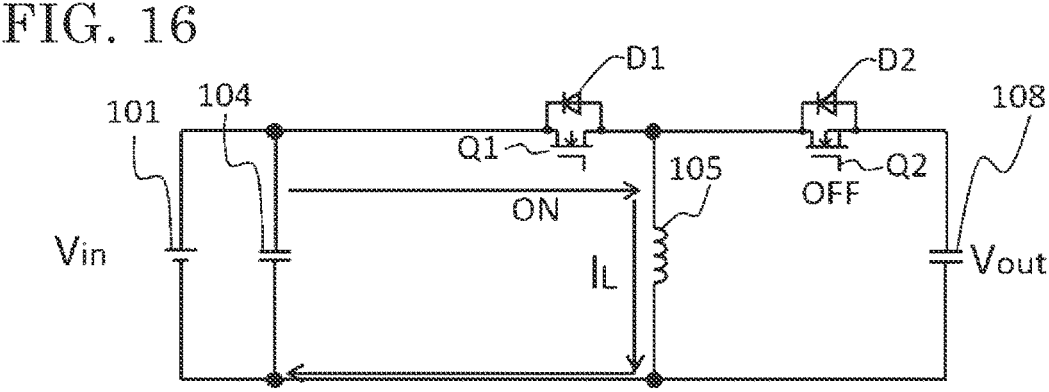
FIG. 16 shows a current path followed immediately before the semiconductor switching element Q1 is turned off, in the power conversion device according to embodiment 4.

FIG. 16 shows a current path followed immediately before the semiconductor switching element Q1 is turned off, in the power conversion device according to embodiment 4. In FIG. 16, Vin represents an input voltage, and Vout represents an output voltage. As shown in FIG. 16, the MOSFET implementing the semiconductor switching element Q1 is conducting current, and thus the current flowing through the buck-boost chopper circuit is equal to the inductor current IL.

With reference to FIG. 15B and FIG. 16, in order to calculate the turn-off loss having occurred in the semiconductor switching element Q1 in the buck-boost chopper, the following expression (19) and expression (20) are used to calculate a drain current ID_off_Q1 and a drain-source voltage VDS_off_Q1 obtained at the time of turning off the semiconductor switching element Q1.

[Mathematical 19]
$$I_{D\_off\_Q1} = I_{L\_det} + \frac{\Delta I}{2} \tag{19}$$

[Mathematical 20]
$$V_{DS\_off\_Q1} = V_{in\_det} - V_{out\_det} \tag{20}$$

Figure 17:
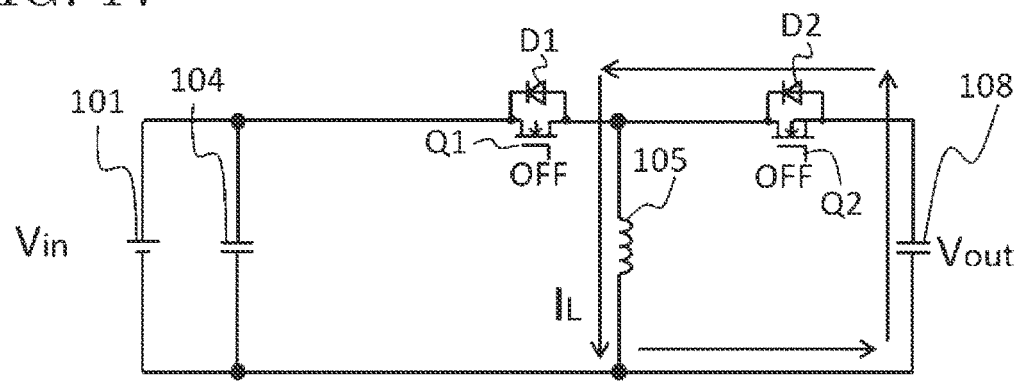
FIG. 17 shows a current path followed immediately before the semiconductor switching element Q2 is turned on, in the power conversion device according to embodiment 4.

FIG. 17 shows a current path followed immediately before the semiconductor switching element Q2 is turned on, in the power conversion device according to embodiment 4. FIG. 17 shows a current path followed during the dead time after the semiconductor switching element Q1 is turned off. During the dead time after the semiconductor switching element Q1 is turned off, the current flowing through the flyback diode D2 is equal to the inductor current IL.

With reference to FIG. 15B and FIG. 17, in order to calculate the turn-on loss having occurred in the semiconductor switching element Q2 in the buck-boost chopper, the following expression (21) and expression (22) are used to calculate a drain current ID_on_Q2 and a drain-source voltage VDS_on_Q2 obtained at the time of turning on the semiconductor switching element Q2.

[Mathematical 21]
$$I_{D\_on\_Q2} = I_{L\_det} + \frac{\Delta I}{2} \tag{21}$$

[Mathematical 22]
$$V_{DS\_on\_Q2} = V_{fwd\_D2} \tag{22}$$

Figure 18:
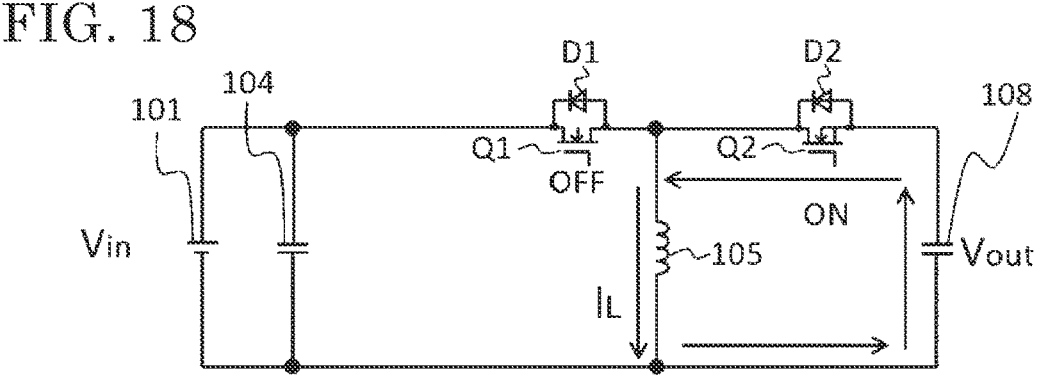
FIG. 18 shows a current path followed immediately before the semiconductor switching element Q2 is turned off, in the power conversion device according to embodiment 4.

FIG. 18 shows a current path followed immediately before the semiconductor switching element Q2 is turned off, in the power conversion device according to embodiment 4. As shown in FIG. 18, the MOSFET implementing the semiconductor switching element Q2 is conducting current, and thus the current flowing through the buck-boost chopper circuit is equal to the inductor current IL.

With reference to FIG. 15B and FIG. 18, in order to calculate the turn-off loss having occurred in the semiconductor switching element Q2 in the buck-boost chopper, the following expression (23) and expression (24) are used to calculate a drain current ID_off_Q2 and a drain-source voltage VDS_off_Q2 obtained at the time of turning off the semiconductor switching element Q2.

[Mathematical 23]

$$I_{D\_off\_Q2} = I_{L\_det} - \frac{\Delta I}{2} \quad (23)$$

[Mathematical 24]

$$V_{DS\_off\_Q2} = V_{fwd\_D2} \quad (24)$$

Figure 19:
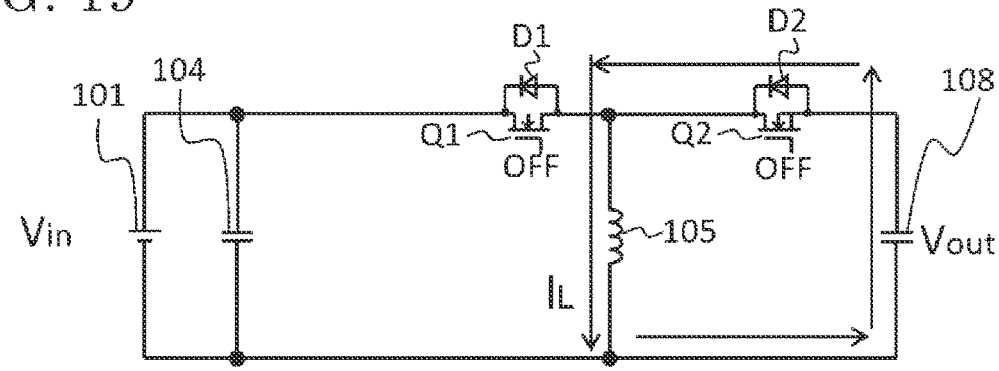
FIG. 19 shows a current path followed immediately before the semiconductor switching element Q1 is turned on, in the power conversion device according to embodiment 4.

FIG. 19 shows a current path followed immediately before the semiconductor switching element Q1 is turned on, in the power conversion device according to embodiment 4. FIG. 19 shows a current path followed during the dead time after the semiconductor switching element Q2 is turned off. During the dead time after the semiconductor switching element Q2 is turned off, the current flowing through the flyback diode D2 is equal to the inductor current IL.

With reference to FIG. 15B and FIG. 19, in order to calculate the turn-on loss having occurred in the semiconductor switching element Q1 in the buck-boost chopper, the following expression (25) and expression (26) are used to calculate a drain current ID_on_Q1 and a drain-source voltage VDS_on_Q1 obtained at the time of turning on the semiconductor switching element Q1.

[Mathematical 25]

$$I_{D\_on\_Q1} = I_{L\_det} - \frac{\Delta I}{2} \quad (25)$$

[Mathematical 26]

$$V_{DS\_on\_Q1} = V_{in\_det} - V_{out\_det} \quad (26)$$

In addition, in order to calculate the recovery loss having occurred in the flyback diode D2, the following expression (27) and expression (28) are used to calculate an anode current IA_rec and a cathode-anode voltage VKA_rec obtained at the time of recovery of the flyback diode D1.

[Mathematical 27]

$$I_{A\_rec} = I_{L\_det} - \frac{\Delta I}{2} \quad (27)$$

[Mathematical 28]

$$V_{KA\_rec} = V_{in\_det} - V_{out\_det} \quad (28)$$

As described above, in embodiment 4, the current values and voltage values that are necessary for calculating the losses included in the loss calculation value Ploss are different from those in embodiment 1. Meanwhile, fluctuation of the inductor current IL due to influence of switching, and the like are the same as those in embodiment 1. Thus, the same advantageous effect as that in embodiment 1 can be obtained in embodiment 4 as well by performing detection of the input voltage, the output voltage, and the inductor current and changing of the frequency command value in synchronization with the carrier in the same manner as in embodiment 1.

Embodiment 5

Figure 20A:
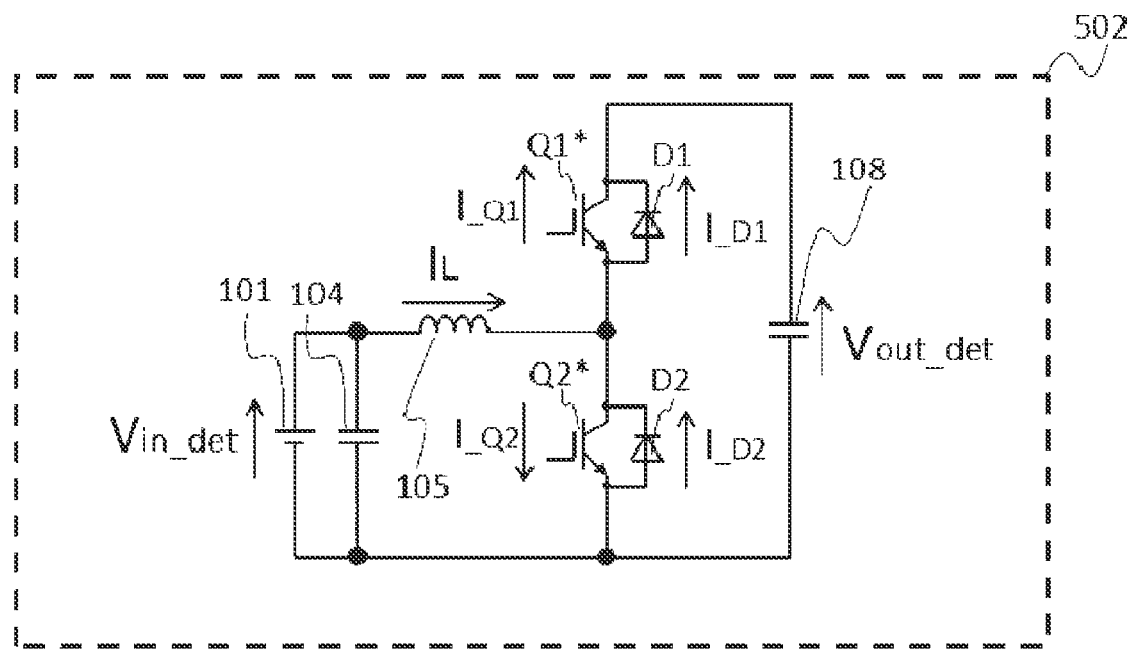
FIG. 20A is a circuit diagram of a power conversion device according to embodiment 5 and is a circuit diagram in a case where an IGBT is used as each switching element of the boost chopper.

Next, embodiment 5 will be described with reference to FIG. 20A and FIG. 20B. Embodiment 5 is different from embodiment 1 in that an insulated gate bipolar transistor (IGBT) is used as each semiconductor switching element. FIG. 20A is a circuit diagram of a power conversion device according to embodiment 5 and is a circuit diagram in a case where an IGBT is used as each switching element of the boost chopper. In FIG. 20A, the control unit is not shown. A power conversion unit 502 is connected to the DC voltage source 101 and driven by the control unit 103 (not shown). The power conversion unit 502 has a boost chopper circuit including a semiconductor switching element Q1* and a semiconductor switching element Q2* which are connected in series to each other and which are each implemented by an IGBT. As is known by comparing FIG. 20A with FIG. 4A, embodiment 5 is different only in that the semiconductor switching element Q1 and Q2 in embodiment 1 are replaced with the semiconductor switching elements Q1* and Q2*. Thus, descriptions of the other components are omitted.

Figure 20B:
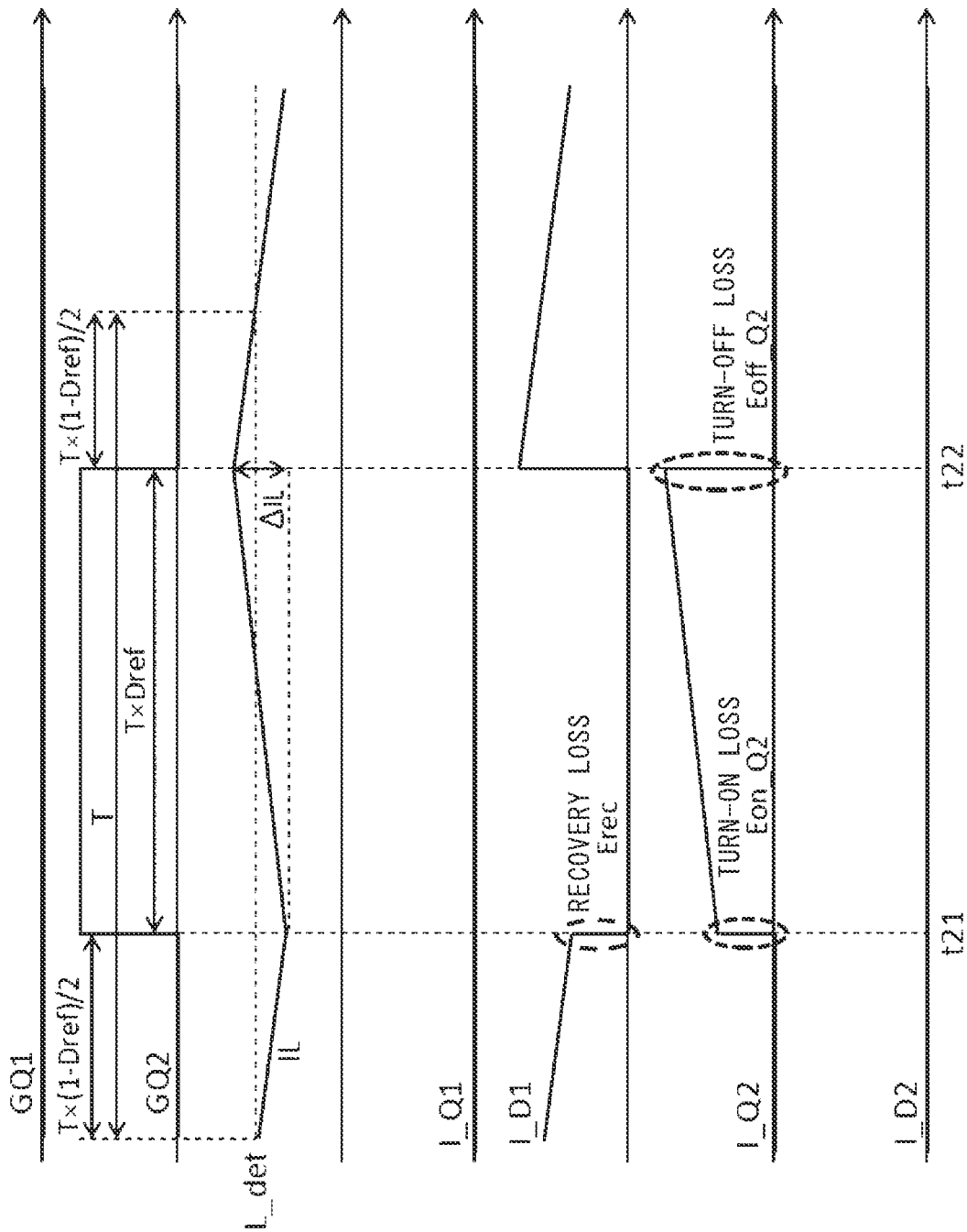
FIG. 20B shows a switching loss generation pattern in the power conversion device according to embodiment 5.

FIG. 20B shows a switching loss generation pattern in the power conversion device according to embodiment 5. In FIG. 20B, a state taken at the time of detecting the inductor current IL is defined as an initial state. In the case of using an IGBT as each semiconductor switching element of the boost chopper, the gate signal GQ1 is constantly OFF (the semiconductor switching element Q1* is constantly OFF). The gate signal GQ2 is OFF (the semiconductor switching element Q2* is OFF) in the initial state. If a control cycle is defined as T, the gate signal GQ2 is caused to be ON (the semiconductor switching element Q2* is turned on) at a time point t21 (=T×(1−Dref)/2) on the basis of the duty command value Dref. At a time point t22 (=t21+T×Dref), the gate signal GQ2 is caused to be OFF (the semiconductor switching element Q2* is turned off).

As shown in FIG. 20B, the turn-on loss (Eon_Q2) in the semiconductor switching element Q2* and the recovery loss (Erec) in the flyback diode D1 occur at the time point t21, and the turn-off loss (Eoff_Q2) in the semiconductor switching element Q2* occurs at the time point t22. In addition, the inductor current IL is equal to the inductor current detection value IL_det in the initial state, but thereafter, fluctuates at the cycle T. The width of the fluctuation during vibration is defined as ΔIL.

In the case of using an IGBT as each semiconductor switching element of the boost chopper, the iron loss Pir and the copper loss Pcop are the same as those in the case of a MOSFET. Meanwhile, the switching loss Psw and the conduction loss Pcon are different from those in the case of a MOSFET. The semiconductor switching element Q1* is constantly OFF and is not switched, and thus a turn-on loss and a turn-off loss related to the semiconductor switching element Q1* do not occur. Therefore, the turn-on loss Eon_Q1 and the turn-off loss Eoff_Q1 in expression (6) are zero. A turn-on loss and a turn-off loss related to the semiconductor switching element Q2* and a recovery loss in the flyback diode D1 are calculated by using expression (11) to expression (16). In the case of an IGBT, a collector corresponds to the drain of the MOSFET, and an emitter corresponds to the source of the MOSFET.

Since the semiconductor switching element Q1* does not conduct current, the conduction loss Pcon occurs in the flyback diode D1 and the semiconductor switching element Q2*. The conduction loss Pcon in this case is calculated by using the following expression (29).

[Mathematical 29]

$$P_{con} = (V_{on\_CE} + V_{fwd\_D1}) I_{L\_det} \tag{29}$$

In expression (29), Von_CE represents an ON voltage between the collector and the emitter and is a value determined according to the current flowing through the semiconductor switching element Q2*.

As described above, in embodiment 5, some of the losses included in the loss calculation value Ploss are different from those in embodiment 1. Meanwhile, fluctuation of the inductor current IL due to influence of switching, and the like are the same as those in embodiment 1. Thus, the same advantageous effect as that in embodiment 1 can be obtained in embodiment 5 as well by performing detection of the input voltage, the output voltage, and the inductor current and changing of the frequency command value in synchronization with the carrier in the same manner as in embodiment 1. Although a case of a boost chopper has been described in embodiment 5, the same applies to a case of a buck chopper.

Embodiment 6

Figure 21A:
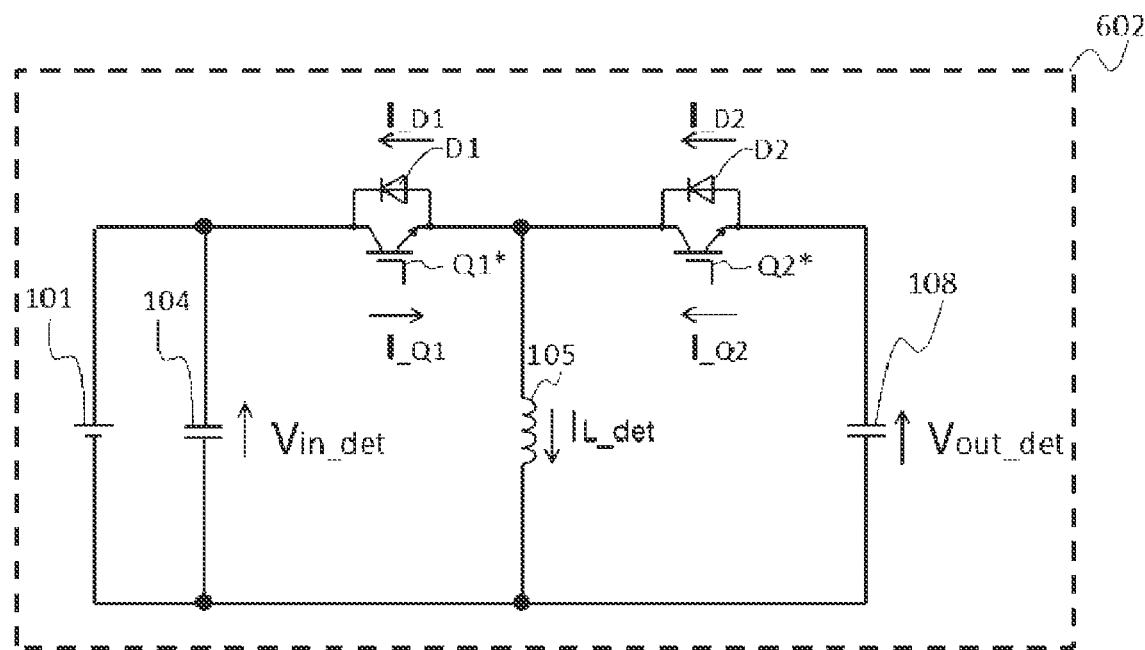
FIG. 21A is a circuit diagram of a power conversion device according to embodiment 6 and is a circuit diagram in a case where an IGBT is used as each switching element of the buck-boost chopper.

Next, embodiment 6 will be described with reference to FIG. 21A and FIG. 21B. Embodiment 6 relates to a buck-boost chopper different from that described in embodiment 4 in that an IGBT is used instead of the MOSFET as each semiconductor switching element. FIG. 21A is a circuit diagram of a power conversion device according to embodiment 6 and is a circuit diagram in the case where an IGBT is used as each switching element of the buck-boost chopper. In FIG. 21A, the control unit is not shown. A power conversion unit 602 is connected to the DC voltage source 101 and driven by the control unit 103 (not shown). The power conversion unit 602 has a buck-boost chopper circuit including the semiconductor switching element Q1* and the semiconductor switching element Q2* which are connected in series to each other and which are each implemented by an IGBT. As is known by comparing FIG. 21A with FIG. 15A, embodiment 6 is different only in that the semiconductor switching elements Q1 and Q2 in embodiment 4 are replaced with the semiconductor switching elements Q1* and Q2*. Thus, descriptions of the other components are omitted.

FIG. 21B shows a switching loss generation pattern in the power conversion device according to embodiment 6. In FIG. 21B, a state taken at the time of detecting the inductor current IL is defined as an initial state. In the case of using an IGBT as each buck-boost semiconductor switching element, the gate signal GQ2 is constantly OFF (the semiconductor switching element Q2* is constantly OFF). The gate signal GQ1 is ON (the semiconductor switching element Q2* is ON) in the initial state. If a control cycle is defined as T, the gate signal GQ1 is caused to be OFF (the semiconductor switching element Q1* is turned off) at a time point t31 (=T×Dref/2) on the basis of the duty command value Dref. At a time point t32 (=t31+T×(1−Dref)), the gate signal GQ1 is caused to be ON (the semiconductor switching element Q1* is turned on).

As shown in FIG. 21B, the turn-off loss (Eoff_Q1) in the semiconductor switching element Q1* occurs at the time point t31, and the turn-on loss (Eon_Q1) in the semiconductor switching element Q1* and the recovery loss (Erec) in the flyback diode D2 occur at the time point t32. In addition, the inductor current IL is equal to the inductor current detection value IL_det in the initial state, but thereafter, fluctuates at the cycle T. The width of the fluctuation during vibration is defined as ΔIL.

In the case of using an IGBT as each semiconductor switching element of the buck-boost chopper, the iron loss Pir and the copper loss Pcop are the same as those in the case of a MOSFET. Meanwhile, the switching loss Psw and the conduction loss Pcon are different from those in the case of a MOSFET. The semiconductor switching element Q2* is constantly OFF and is not switched, and thus a turn-on loss and a turn-off loss related to the semiconductor switching element Q2* do not occur. Therefore, the turn-on loss Eon_Q2 and the turn-off loss Eoff_Q2 in expression (6) are zero. A turn-on loss and a turn-off loss related to the semiconductor switching element Q1* and a recovery loss in the flyback diode D2 are calculated by using expression (19), expression (20), and expression (25) to expression (28).

Since the semiconductor switching element Q2* does not conduct current, the conduction loss Pcon occurs in the flyback diode D2 and the semiconductor switching element Q1*. The conduction loss Pcon in this case is calculated by using the following expression (30).

[Mathematical 30]

$$P_{con} = (V_{on\_CE} + V_{fwd\_D2}) I_{L\_det} \tag{30}$$

In expression (30), Von_CE represents the ON voltage between the collector and the emitter and is a value determined according to the current flowing through the semiconductor switching element Q1*.

As described above, in embodiment 6, some of the losses included in the loss calculation value Ploss are different from those in embodiment 4. Meanwhile, fluctuation of the inductor current IL due to influence of switching, and the like are the same as those in embodiment 4. Thus, the same advantageous effect as that in embodiment 4 can be obtained in embodiment 6 as well by performing detection of the input voltage, the output voltage, and the inductor current and changing of the frequency command value in synchronization with the carrier in the same manner as in embodiment 4.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the technical scope of the present disclosure.

DESCRIPTION OF THE REFERENCE CHARACTERS

100 power conversion device
101 DC voltage source
102, 302, 402, 502, 602 power conversion unit
103 control unit
105 reactor
109, 111 voltage detector 110 current detector
112 voltage control unit
113, 213 frequency control unit
113a loss calculation unit
113a3 iron loss calculation unit
113a4 copper loss calculation unit
113a5 switching loss calculation unit
113a6 conduction loss calculation unit
113b, 213b frequency determination unit
114 carrier generation unit
D1, D2 flyback diode
Q1, Q1*, Q2, Q2* semiconductor switching element
IL inductor current
IL_det inductor current detection value
Vin input voltage
Vin_det input voltage detection value
Vout output voltage
Vout_det output voltage detection value
Dref duty command value
fsw switching frequency
fsw_ref frequency command value
car carrier
Ploss loss calculation value
Pir iron loss
Pcop copper loss
Psw switching loss
Pcon conduction loss

The invention claimed is:

1. A power conversion device which converts an input voltage from a DC voltage source and outputs a resultant voltage as an output voltage, the power conversion device comprising:
a plurality of semiconductor switching elements connected between the DC voltage source and an output side, and connected in series with each other;
an inductor connected between the DC voltage source and the output side;
a controller which controls a switching frequency of each of the plurality of semiconductor switching elements; and
a detector which performs detection of a voltage value of the input voltage, a voltage value of the output voltage, and a current value of an inductor current flowing through the inductor, wherein
the controller includes
a voltage controller which calculates an output voltage command value on the basis of the voltage value of the input voltage and the voltage value of the output voltage which have been obtained through the detection,
a frequency controller which calculates a frequency command value on the basis of the voltage value of the input voltage, the voltage value of the output voltage, the current value of an inductor current, and the output voltage command value, and
a carrier generator which generates a carrier on the basis of the frequency command value, and
detection by the detector and changing of the switching frequency by the controller are each set to be performed at a timing that allows synchronization with the carrier on the basis of the carrier.

2. The power conversion device according to claim 1, wherein the voltage controller changes a control parameter according to the frequency command value.

3. The power conversion device according to claim 1, comprising a boost chopper, a buck chopper, or a buck-boost chopper.

4. The power conversion device according to claim 1, wherein, in a case where the carrier is a triangular wave carrier, the detection and the changing of the switching frequency are each performed at a timing at which a phase of the triangular wave carrier becomes 0 degrees or 180 degrees.

5. The power conversion device according to claim 4, wherein the voltage controller changes a control parameter according to the frequency command value.

6. The power conversion device according to claim 1, wherein, in a case where the carrier is a saw-tooth wave carrier, the detection and the changing of the switching frequency are each performed at a timing shifted from timings at which the saw-tooth wave carrier reaches a top and a bottom thereof.

7. The power conversion device according to claim 6, wherein the voltage controller changes a control parameter according to the frequency command value.

8. The power conversion device according to claim 1, wherein
the frequency controller includes
a loss calculator which calculates, as a loss calculation value, a loss that occurs in association with operation of the power conversion device, and
a frequency determination circuitry which obtains, on the basis of the loss calculation value, a switching frequency at which the loss becomes minimum, the frequency determination circuitry being configured to output the switching frequency as the frequency command value.

9. The power conversion device according to claim 8, wherein, in a case where the carrier is a triangular wave carrier, the detection and the changing of the switching frequency are each performed at a timing at which a phase of the triangular wave carrier becomes 0 degrees or 180 degrees.

10. The power conversion device according to claim 8, wherein, in a case where the carrier is a saw-tooth wave carrier, the detection and the changing of the switching frequency are each performed at a timing shifted from timings at which the saw-tooth wave carrier reaches a top and a bottom thereof.

11. The power conversion device according to claim 8, wherein the voltage controller changes a control parameter according to the frequency command value.

12. The power conversion device according to claim 8, wherein the frequency determination circuitry obtains, through hill climbing, the switching frequency at which the loss calculation becomes minimum.

13. The power conversion device according to claim 12, wherein the voltage controller changes a control parameter according to the frequency command value.

14. The power conversion device according to claim 12, wherein the loss calculation value includes at least one of: an iron loss in the inductor; a copper loss in the inductor; a switching loss in each of the plurality of semiconductor switching elements; and a conduction loss in each of a plurality of flyback diodes connected in antiparallel to the plurality of respective semiconductor switching elements.

15. The power conversion device according to claim 14, wherein the loss calculator calculates the switching loss by using a data sheet indicating a relationship between: switching loss; and current flowing through each of the plurality of switching elements and voltage between terminals of the switching element.

16. The power conversion device according to claim 14, wherein the loss calculator calculates the switching loss by using an approximation expression based on current flowing through each of the plurality of switching elements and voltage between terminals of the switching element.

17. The power conversion device according to claim 8, wherein the loss calculation value includes at least one of: an iron loss in the inductor; a copper loss in the inductor; a switching loss in each of the plurality of semiconductor switching elements; and a conduction loss in each of a plurality of flyback diodes connected in antiparallel to the plurality of respective semiconductor switching elements.

18. The power conversion device according to claim 17, wherein the loss calculator calculates the switching loss by using a data sheet indicating a relationship between: switching loss; and current flowing through each of the plurality of switching elements and voltage between terminals of the switching element.

19. The power conversion device according to claim 17, wherein the loss calculator calculates the switching loss by using an approximation expression based on current flowing through each of the plurality of switching elements and voltage between terminals of the switching element.

20. The power conversion device according to claim 17, wherein the voltage controller changes a control parameter according to the frequency command value.

* * * * *